United States Patent [19]
Tarui et al.

[11] Patent Number: 5,606,686
[45] Date of Patent: Feb. 25, 1997

[54] ACCESS CONTROL METHOD FOR A SHARED MAIN MEMORY IN A MULTIPROCESSOR BASED UPON A DIRECTORY HELD AT A STORAGE LOCATION OF DATA IN THE MEMORY AFTER READING DATA TO A PROCESSOR

[75] Inventors: Toshiaki Tarui; Naonobu Sukegawa, both of Kokubunji; Hiroaki Fujii, Hadano; Katsuyoshi Kitai, Kokubunji, all of Japan

[73] Assignee: Hitachi, Ltd., Tokyo, Japan

[21] Appl. No.: 328,759

[22] Filed: Oct. 24, 1994

[30] Foreign Application Priority Data

Oct. 22, 1993 [JP] Japan .................................. 5-287403

[51] Int. Cl.$^6$ .................................................. G06F 12/08
[52] U.S. Cl. ........................ 395/448; 395/470; 395/471; 395/472
[58] Field of Search .................................. 395/449, 470, 395/403, 445, 446, 447, 448, 457, 468, 469, 471, 472, 473, 483, 415, 417, 200.03, 200.1, 200.11, 200.13

[56] References Cited

U.S. PATENT DOCUMENTS

| | | | |
|---|---|---|---|
| 4,755,930 | 7/1988 | Wilson, Jr. et al. | 395/425 |
| 5,058,006 | 10/1991 | Durdan et al. | 395/325 |
| 5,193,163 | 3/1993 | Sanders et al. | 395/425 |
| 5,287,484 | 2/1994 | Nishii et al. | 395/425 |
| 5,317,720 | 5/1994 | Stamm et al. | 395/425 |
| 5,359,723 | 10/1994 | Mathews et al. | 395/425 |

FOREIGN PATENT DOCUMENTS 5-89056  4/1993  Japan .

OTHER PUBLICATIONS

The Stanford Dash Multiprocessor, IEEE Computer, Mar. 1992, pp. 63–79.
Directory–based Cache Coherence in Large–Scale Multiprocessors, IEEE Computer, 1990 Jun., pp. 49–58.
The Stanford FLASH Multiprocessor, Proc. of the 21st Annual International Symposium on Computer Architecture 1994 Apr. 18–21, pp. 302–313.

Primary Examiner—Matthew M. Kim
Attorney, Agent, or Firm—Antonelli, Terry, Stout & Kraus, LLP

[57] ABSTRACT

A main memory shared by plural processing units in a parallel computer system is composed of plural partial main memories. A directory for each data line of the main memory is generated after the data line has been cached in one of the processing units. The directory is held in one of the partial main memories in place of the data line. The directory indicates a processing unit which has cached the data line. A status bit C provided for the data line is set. If a subsequent read request is given to the data line, the status C bit is checked and the directory is used to identify a processing unit that has cached the data line. The request is transferred to the identified processing unit, and the data line is transferred from that processing unit to the processing unit that has issued the request. If a processing unit that has cached the data line has replaced the data line, it is checked if there is a processing unit that has cached the data line. If there is none, the data line is written back into the one partial main memory. If there is, the data line is not written back. Another status bit RO is also used for each data line. It indicates if the data line is read only. If a data line is read only, generation of the directory and storing it in the partial main memory is prohibited.

25 Claims, 11 Drawing Sheets

FIG. 5

212 EXTERNAL COMMAND GENERATING CIRCUIT

| HIT/MISS | CACHE STATE | CPU COMMAND | | | EXTERNAL COMMAND | | | | | | |
|---|---|---|---|---|---|---|---|---|---|---|---|
| | | READ | WRITE COMPARE & SWAP | FLUSH | INVALIDATE CACHE | REQ | REQ-INVALIDATE CACHE | EXCLUSIVE | DATA | DATA-READ ONLY | DATA-CACHE |
| MISS | / | F | FI | / | / | / | / | / | / | / | / |
| HIT | I | F | FI | / | / | / | / | / | / | / | / |
| HIT | E | / | / | FL | | DATA-CACHE | DATA-CACHE | / | / | / | / |
| HIT | S | / | I | FL | | DATA-CACHE | DATA-CACHE | / | / | / | / |
| HIT | R | / | / | / | / | / | / | / | / | / | / |

I : INVALID  
E : EXCLUSIVE  
S : SHARED  
R : READ ONLY  
F : FETCH  
FI : FETCH & INVALIDATE  
FL : FLUSH INSTRUCTION

FIG. 6

213 NEXT STAGE CONTROL CIRCUIT

| HIT/MISS HIT | CACHE STATE | CPU COMMAND |  |  |  | EXTERNAL COMMAND |  |  |  |  |  |
|---|---|---|---|---|---|---|---|---|---|---|---|
|  |  | READ | WRITE COMPARE & SWAP | FLUSH | INVALIDATE CACHED | REQ | REQ-INVALIDATE CACHED | EXCLUSIVE | DATA | DATA-RO | DATA-CACHE |
| MISS |  | F WAIT | FI WAIT | NO CHANGE | NO CHANGE | / | / | NO CHANGE | / | / | / |
| HIT | I | F WAIT | FI WAIT | I | I | / | / | I | / | / | / |
| HIT | E | E | E | I | I | S | I | E | / | / | / |
| HIT | S | S | E | I | I | S | I | E | / | / | / |
| HIT | R | R | / | I | I | / | / | / | / | / | / |
| FETCH INSTRUCTION WAIT |  | OPERATION DEPENDS UPON CACHE STATE AND NOT UPON FETCH OR FETCH & INVALIDATE WAIT STATE | | | | | | | E | R | S |
| FETCH & INVALIDATE WAIT |  | | | | | | | | E | / | E |

I: INVALID   E: EXCLUSIVE   S: SHARED   R: READ ONLY   F: FETCH INSTRUCTION   FI: FETCH & INVALIDATE

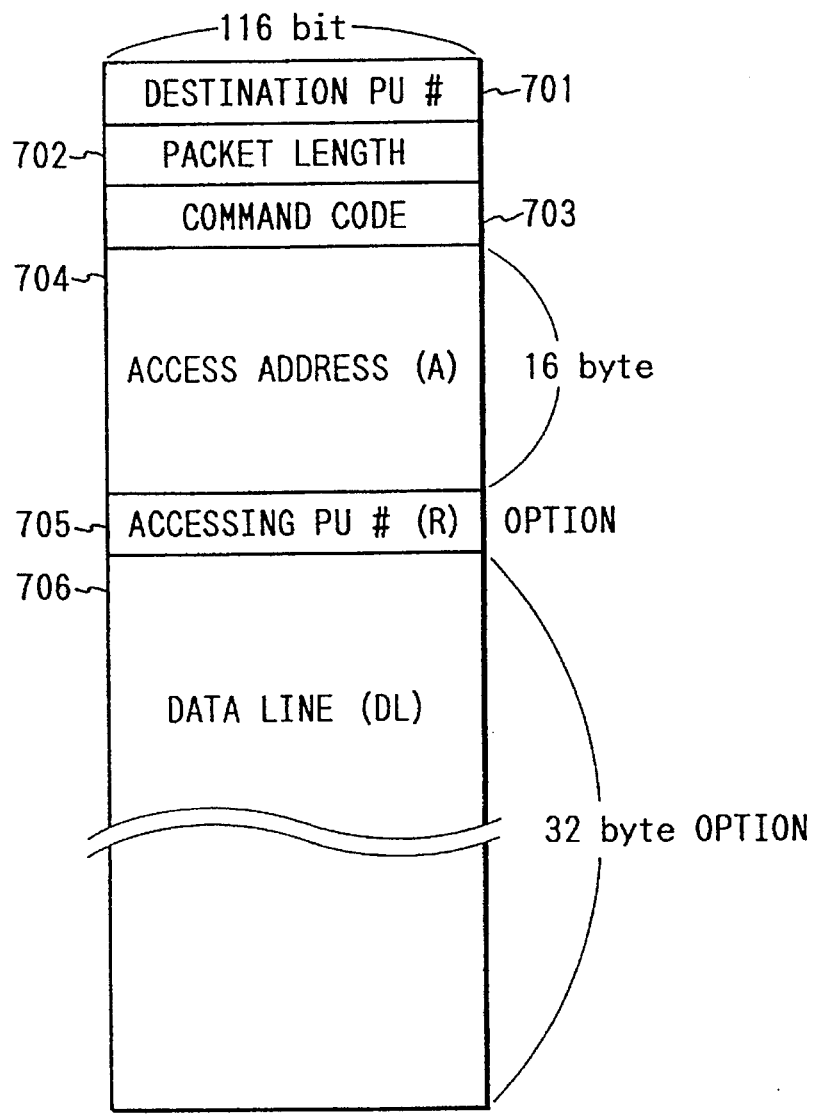

ACCESS CONTROL METHOD FOR A SHARED MAIN MEMORY IN A MULTIPROCESSOR BASED UPON A DIRECTORY HELD AT A STORAGE LOCATION OF DATA IN THE MEMORY AFTER READING DATA TO A PROCESSOR

BACKGROUND OF THE INVENTION

The present invention relates to an access request control scheme for a main memory shared by a multiprocessor system incorporating a plurality of processing units by using directory information indicating which processing unit holds specific data in an address of the main memory. More specifically, the present invention relates to a main memory access control scheme suitable for a parallel computer system with a distributed main memory for the processing units connected through a network capable of performing parallel data transfer.

In a parallel computer system, there is a well-known architecture having a main memory shared by a plurality of processing units (referred to as PUs herein), wherein each processing unit being provided for a cache.

In particular, the Japanese Laid-Open Patent Application No. 5-89056 (referred to as "reference #1" herein), "The Stanford dash Multiprocessor," IEEE Computer, March 1992, pp. 63–79 (referred to as "reference #2" herein) and the like have proposed a parallel computer system having physically distributed and logically shared (distributed shared) memory system for this type of parallel processor.

In these parallel computers, a main memory is distributed for each PU, and each PU is coupled with a network, such as multistage interconnection network, for transferring a plurality of data in parallel in order to provide a network throughput suitable to the number of PU's and in order to avoid the limit of the connectable number of PU's.

The main memory controller of the distributed shared memory scheme of the parallel computer of the Prior Art has been connected to, as documented in the reference #2, each data line of the main memory for each respective PU, and the directory structure indicating for which PU a data line is cached (which PU has a copy of that data line in its own cache) is stored in a dedicated memory for this specific purpose and is separate from the main memory.

When a command for maintaining the cache coherency is required to be sent, when shared data has been modified, the command is first sent to the main memory. Then, the main memory controller sends the command to a PU that is indicated by a directory associated with the main memory. At the same time, the contents of the directory are updated. When a PU writes to data, an invalidation command is sent to all of other #PU's indicated by the directory for that data. Then all copies cached in these PU's are erased. When a PU reads cached data, the read command is sent to one of the PU's indicated by the directory so that the cached data is provided from the cache of that PU to the PU requesting the read command.

By managing the caches by means of a directory structure, a command to maintain the cache coherency is sent only to the PU caching the appropriate data line. As the command is not sent to other PU's, the broadcasting to all PU's is not necessary. Thus, the management of the cache coherency of the main memory data distributed to each network-connected PU's may be efficiently performed.

In the reference #2, the directory for each data line is indicated by a so-called bitmap, having one bit indicating whether or not a data line is cached for each PU.

Another scheme has also been proposed, in which the number of PU's actually caching a data line is stored as directory, instead of bitmap. See, for example, "Directory-based Cache Coherence in Large-Scale Multiprocessors," IEEE Computer, 1990 June, pp. 49–58 (referred to as "reference #3" herein). The technique mentioned in this reference is called "limited pointer" scheme (or simply, pointer scheme), in which the PU number stored as directory is limited to a given number, such as eight.

Another scheme has been further proposed, in which the stored PU number, using this pointer scheme, is held in a location in the main memory other than the locations of data lines. See, for example, "The Stanford FLASH Multiprocessor," Proc. of the 21st Annual International Symposium on Computer Architecture, 1994 Apr. 18–21, pp. 302–313 (referred to as "reference #4" herein).

Since the prior art reference #2 requires to hold, for each line of main memory, a directory indicating which PU caches which line in a memory, there is a disadvantage of having a large amount of memory for the directory. In the example of 16 PU's of the Prior Art mentioned above, given that the system has 16 PU's and that a machine is 1 word=8 bytes, 1 line=4 word and a directory of 16 bits is needed for one line of cache (4×8×8=256 bits), the amount of directory becomes 1/16 of the size of the main memory, and the cost of hardware requirement is high. Thus, the more the PU's the computer system has, the more the directory cost increases. For example, if a machine of 256 PU's holds directories as bitmap pattern mentioned above, a directory of 256 bits is required for one cache line. This amount will correspond to that of main memory.

The pointer scheme mentioned in the reference #3 requires a less amount of dedicated memory for directories than that of the bitmap style directory. However, the amount may not be negligible for a line size since a plurality of pointers must be held.

Another pointer scheme mentioned in the reference #4 uses main memory as the storage of directories to eliminate the requirement of dedicated memory. However, this scheme has a problem in that the memory space for data storage may be decreased, since the amount of main memory used for the storage of directories cannot be neglected.

As set forth above, if the distributed shared memory is implemented by using the directory scheme of the Prior Art, the cost of hardware requirement will significantly increase, because the amount of memory used for the storage of directories becomes large when compared with the amount of main memory for data storage.

SUMMARY OF THE INVENTION

Thus, one object of the present invention is to provide the realization of a distributed shared memory of the directory scheme, without the need to increase the amount of memory for the storage of directory structure.

In order to achieve the object, in one preferable aspect of the present invention, status information indicating whether or not the data line of the main memory of each processing unit is cached in one of the processing units is provided in correspondence with each data line of the main memory. The status information is changed to a cached state if that data line is cached in one of the processing units, and directory information indicating which processing unit has cached the data line is stored into the location in the main memory instead of that data line. If the combination of the processing units caching the data line is changed, then the directory information will be updated to indicate the new combination of the processing units caching the data line.

However, if the data line is not cached in any one of the processing units, the cached data line is written back to the main memory instead of directory information. Thus, when the cached data line is replaced because of a shortage of free space of the cache or is purged from the cache by an explicit command from its processor, the cached data line and its address in the cache are sent to the main memory. The directory corresponding to the data line stored in the main memory is read out, and by examining the directory, if there exists two or more processing units which cache the data line in the cache, only the contents of that directory is updated. If there exists only one processing unit caching the data line, the data line sent from the cache is written back to the main memory instead of its directory.

In one preferable aspect of the present invention, in correspondence to each data line of main memory of a respective processing unit, information RO indicating whether or not the data line is read-only is provided. The directory information is used as mentioned above, if a data line which is not read-only is cached. The directory information will not be created if the cached data line is read-only.

BRIEF DESCRIPTION OF THE DRAWINGS

FIG. 5 is a schematic diagram indicating the relationship of the input and output of external command generation circuit in FIG. 4.

FIG. 6 is a schematic diagram indicating the relationship of the input and output of cache next state control circuit in FIG. 4.

FIG. 7 is a schematic diagram indicating the relationship of the input and output of write-back control circuit in FIG. 4.

FIG. 8 is a schematic diagram indicating a format of the packet used for the embodiment.

DETAILED DESCRIPTION OF THE PREFERRED EMBODIMENTS

Figure 1A:
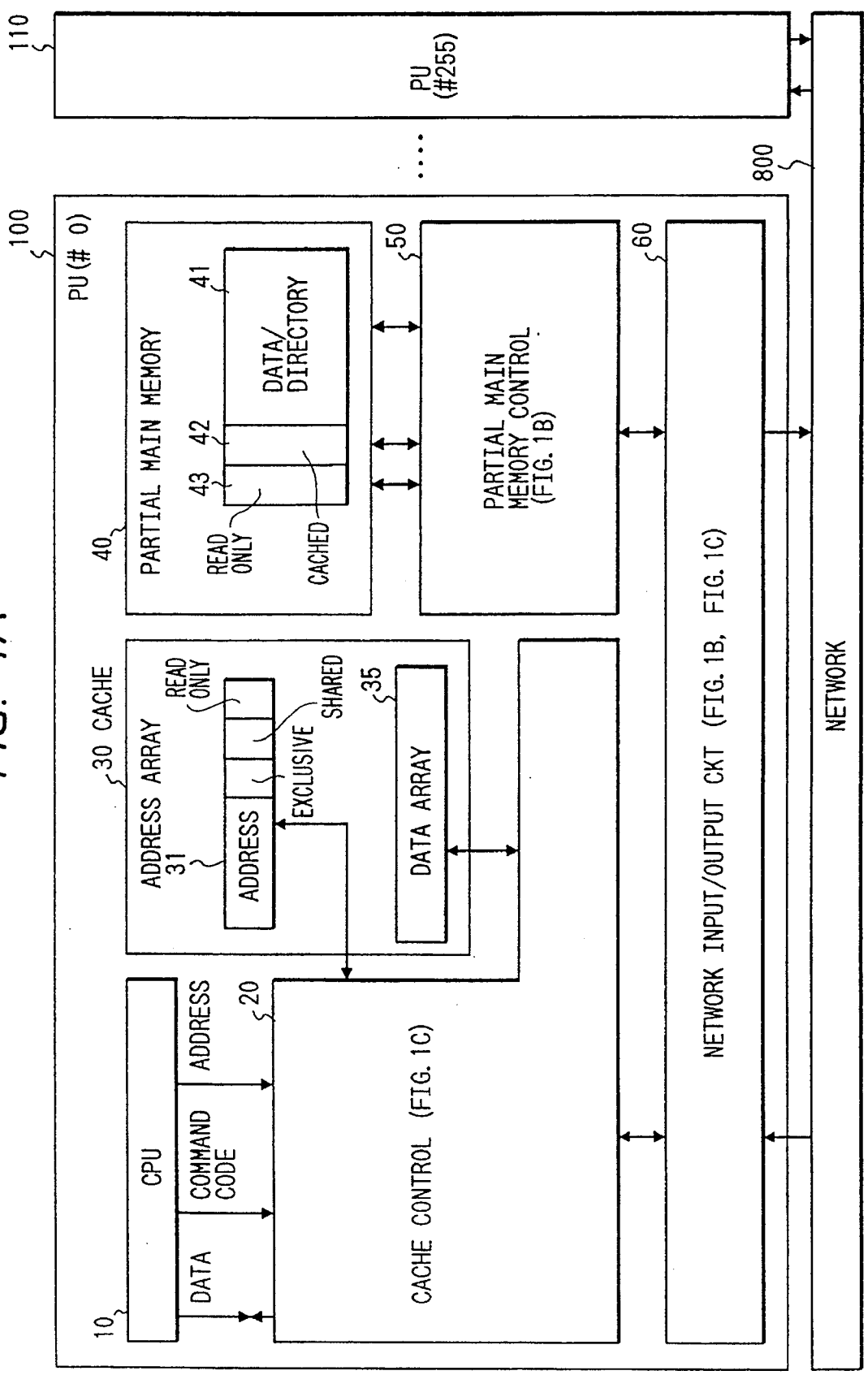
FIG. 1A is a schematic diagram of the architecture of a parallel computer system of one preferred embodiment of the present invention.

Referring to FIG. 1A, reference numbers 100 and 110 respectively designate processing units (referred so as to PU herein below), and reference number 800 designates a network which interconnects a plurality of PU's, the network performing parallel data transfer between a plurality of PU's. Most of network architecture such as multistage interconnection network and MESH are used for the network. In this figure, although only detailed architecture inside PU #0 is shown, other PU's have the same structure.

In FIG. 1A, reference number 10 is a CPU, 30 is a cache, 20 is a cache controller, 40 is a distributed main memory, 50 is a distributed main memory control circuit, and 60 is a network I/O circuit.

Each PU processes not only the commands issued by the CPU 10 (CPU command) but also the commands generated from other PU's and which are transferred through the network 800 (external command).

The distributed main memory of all of the PU's is shared by these PU's to compose one logical main memory. Each address location of the distributed main memory 40 holds a data line field 41 having 256 bits, and as the attribute of the data line (main memory state), a C bit field 42 for indicating whether or not the data line is held in any one of the PU's, as well as RO bit field 43 for indicating whether or not the data line is read-only.

Figure 1B:
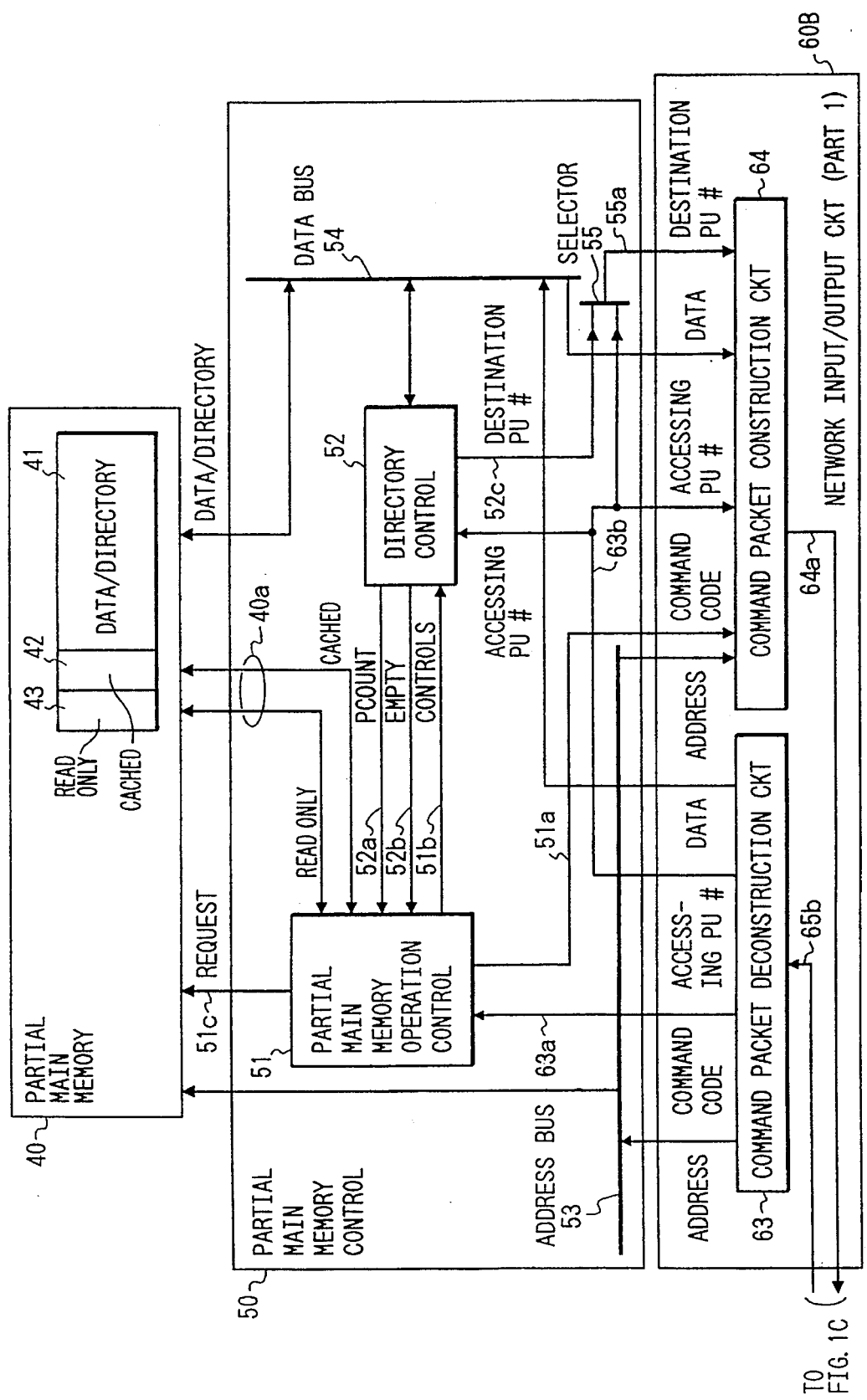
FIG. 1B is a schematic diagram of part of the parallel computer system shown in FIG. 1A.

Distributed main memory control circuit 50 is a circuit which receives external commands associated with the distributed main memory, provided from the network 800, and accesses and controls the distributed main memory 40. As shown in FIG. 1B, the circuit comprises a distributed main memory operation control circuit 51, a directory control circuit 52, and other circuitry. The distributed main memory operation control circuit 51 processes external commands in accordance with the C and RO bits of the main memory address specified by the commands. This circuit is comprised of a case control circuit 516, control processor 514 which performs the process based on the case determined, and a main memory state control circuit 515 which generates the updated main memory state information to write to the distributed main memory.

Figure 1C:
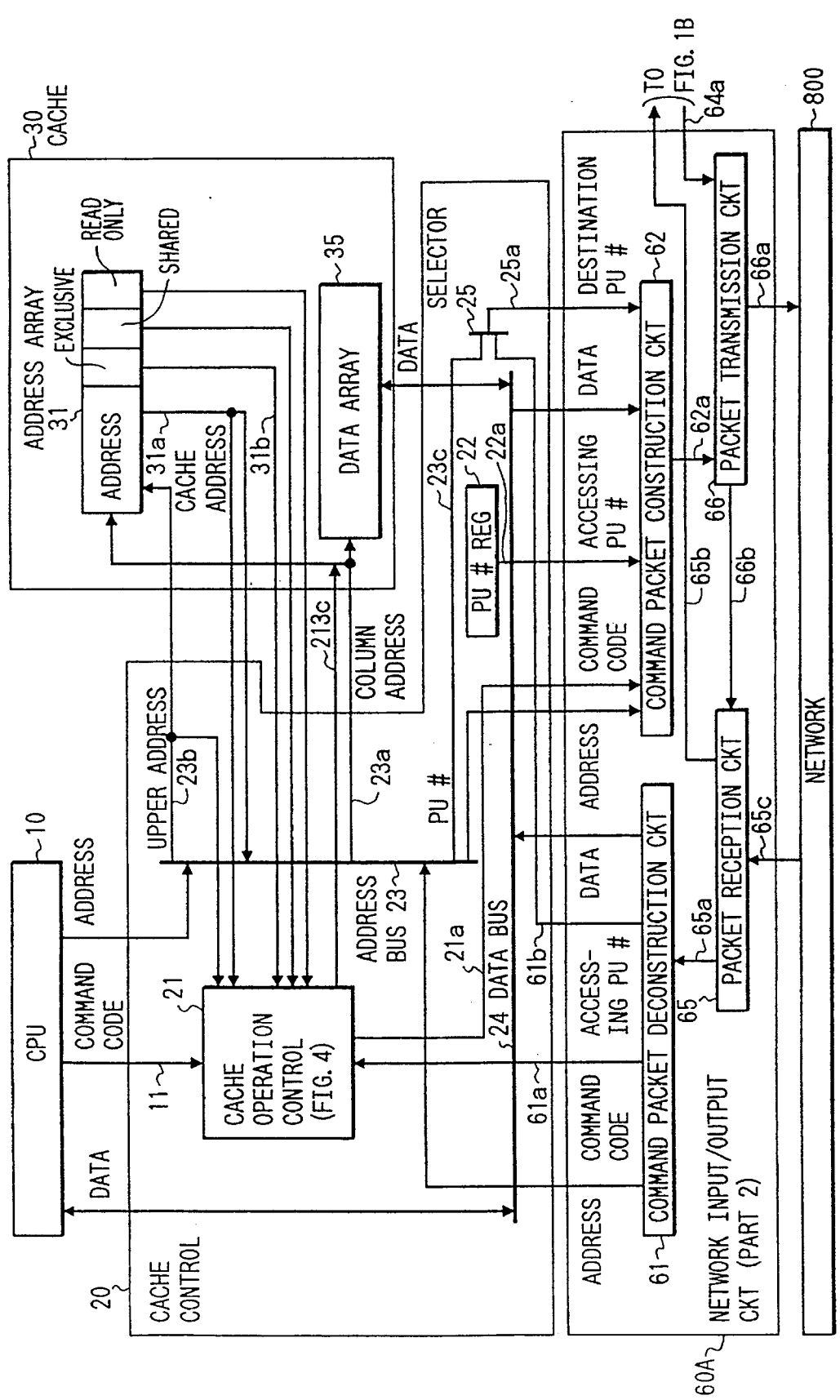
FIG. 1C is a schematic diagram of another part of the parallel computer system shown in FIG. 1A.

The cache control circuit 20 comprises a cache operation control circuit 21 and other circuitry, as shown in FIG. 1C.

The cache 30 has a data array 35 for storing data lines, and an address array 31 for storing the address of the data line cached in the data array. In this embodiment the Stored-in type cache is used, and the Stored-Through type is not used.

The network I/O circuit 60 is a circuit for exchanging the packets including external commands (referred as to "command packet" herein below) between the cache controller 20, the distributed main memory controller 50, and the network 800.

Figure 2A:
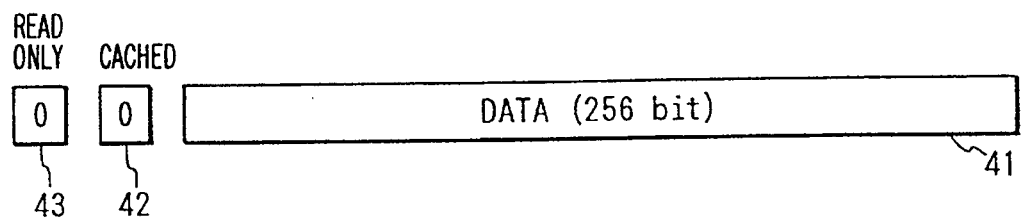
FIG. 2A is a schematic diagram indicating main memory state bits in that an associated data line is held in a storage location of the partial main memory, in the preferred embodiment.
Figure 2B:
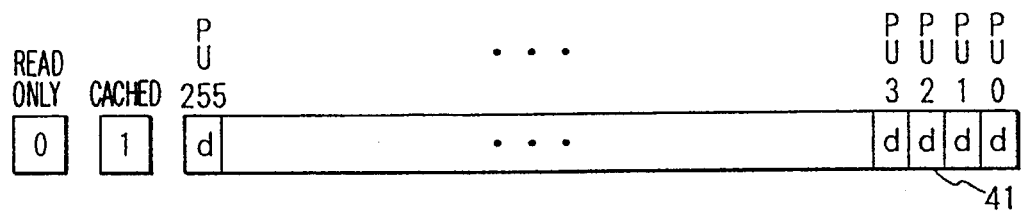
FIG. 2B is a schematic diagram indicating directory structure held in the partial main memory instead of the data line shown in FIG. 2A.

One of the features of the present invention is that, when a data line 41 of any of the addresses of the distributed main memory 40 is read out by any one PU, the directory generated in the distributed main memory control circuit 50 is stored at the location where the data line was held. Accordingly, the dedicated memory for storing the directory, or the memory space on the main memory for storing the directory is not required to be provided in addition to the memory space for storing data lines. For example, FIG. 2A shows a data line 41 and its associated attribute bits RO and C when the data line 41 is not cached by any of the PU's, and FIG. 2B shows a directory written after the data line has been cached by any one of PU's and the attribute bits RO and C associated to the original data line. In this embodiment, the directory comprises a bitmap in which one bit for each PU is used to indicate whether or not the PU caches the data line of that main memory address. However, the present invention is not intended to be limited to use the directory structure shown in this embodiment.

When one of the PU's has cached this data line, and thereafter a read request for the data line of the same address is issued by one of any other PU's, then the data line is transferred from the cache of the PU which has already cached it, onto the PU which has requested it.

When a data line cached in one of the PU's has been replaced in that cache, if that data line is also cached in other PU's, then the replaced data line is not written back to the partial main memory to which the data line belongs. If that data line is not cached in the cache of any other PU's, the replaced data line will be written back. The directory will be held in the distributed main memory instead of that data line, until this data line is written back to the distributed main memory. When the combination of processing units holding this data line is changed, a new directory is generated by the distributed main memory control circuit 50 according to the change of combination, and the updated directory will be written into the distributed main memory 40.

Figure 2C:
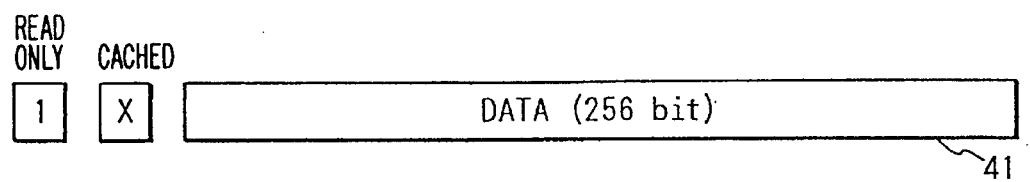
FIG. 2C is a schematic diagram indicating the main memory state bits if the data line of FIG. 2A is read-only.

In addition, in the preferred embodiment, each data line of the distributed main memories of the processing units has a RO bit which indicates whether or not the line is read-only. The above mentioned control is performed only on a data line which is not read-only. No directory is generated for the read-only data line. FIG. 2C shows such a data line and its associated values of attributes RO and C. It should be noted that this data line and its associated attribute C and RO will not be changed thereafter even if an access by any PU is made.

The details of the preferred embodiment of the present invention will be now described below.

Figure 3A:
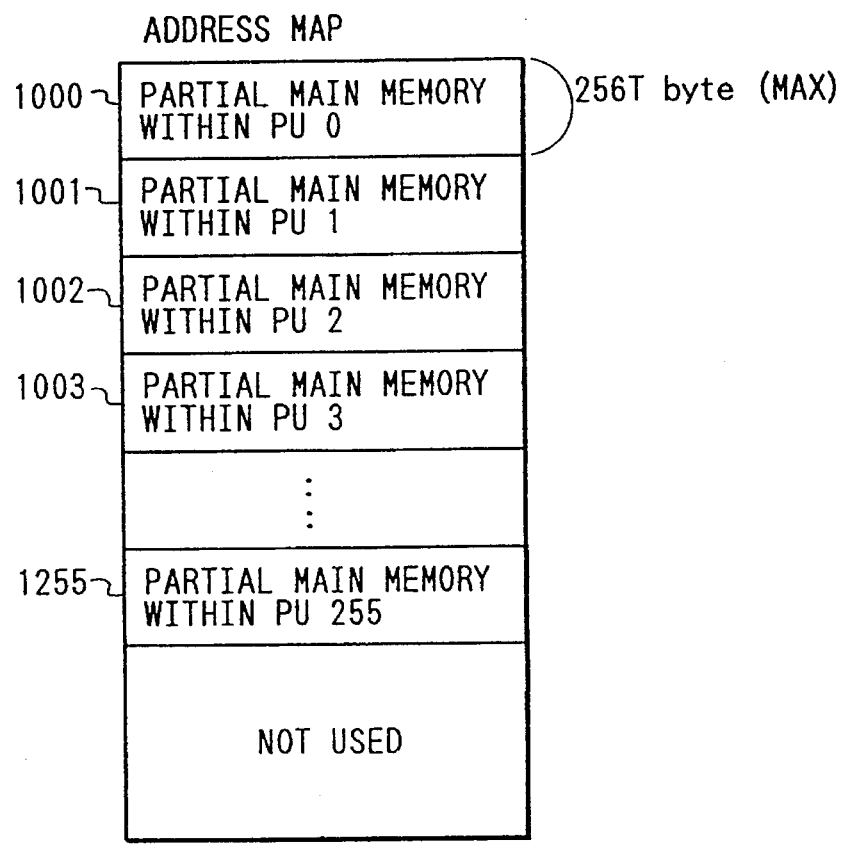
FIG. 3A is a schematic diagram indicating an address map of a plurality of partial main memory of the preferred embodiment.
Figure 3B:
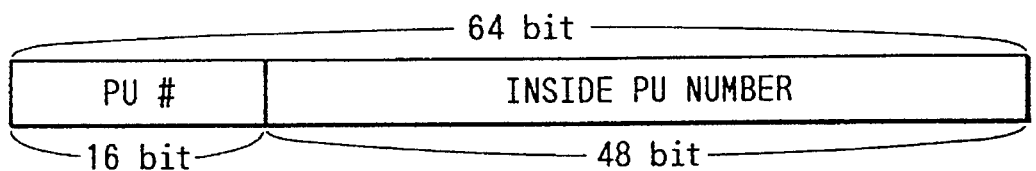
FIG. 3B is a schematic diagram indicating the bit pattern of the main memory address of the preferred embodiment.

Referring to FIG. 3A, there is shown the address map of the main memory used for the system of the preferred embodiment. The distributed main memory of all of the PU's is put into one common addressing space, therefore each PU may access the portion of the distributed main memory of other PU's the same as to their own portion. Accordingly, the upper bits of the main memory addresses used for the access to the main memory indicates the number of the PU which holds the distributed main memory assigned to that address, and the lower bits of the main memory addresses indicate the address within the distributed main memory of that PU. For instance, as shown in FIG. 3B, when 256 PU's are used and the main memory address is 64 bits, the most significant 16 bits of this address indicates the number of the PU having the distributed main memory to which this address belongs. Also, the remaining lower 48 bits of the main memory address indicates the address inside the distributed main memory of that PU.

The following four CPU commands are issued by CPU 10 for accessing the main memory:

READ of data from main memory,
WRITE of data to main memory,
FLUSH of the data in the cache to main memory, and
COMPARE AND SWAP (1) Main Memory Read Operation (1a) Cache Control Circuit 20 inside the accessing PU (part 1)

Each entry of the address array 31 of the cache 30 has a cache address and three bits indicating E (Exclusive), S (Shared), and R (Read-only) as the attribute (a change bit) of that data line. When any of these three bits is zero, the state of this entry is determined to be I (Invalid). In this preferred embodiment, the attribute indicating whether or not the CPU 10 has updated each of entry of the data array 35 after it was loaded to the cache memory for the first time is not needed to be held in the address array 30.

Given that the main memory address specified by the CPU is 64 bits, the portion of least significant 20 bits of the main memory address is used for the column address for the cache. The upper portion of the main memory address other than the column address is held in the address array 31 as a cache address when data is stored in the cache. As mentioned above, the cache 30 is assumed to be a direct-map cache herein, however other type of cache mechanisms may be used instead.

The cache control circuit 20 is a circuit for receiving commands from the CPU 10 of its associated PU or from other PU through the network 800 and for performing an operation in accordance with the cache state E, S and R.

The cache operation control circuit 21 begins its operation by being triggered by a CPU command 11 or external command 61*a*.

In any one PU, for example PU #1, when the CPU 10 performs memory access, the command, and the main memory address, as well as the data used for writing are sent to the cache control circuit 20, if the command is a WRITE or a COMPARE_AND_SWAP command.

At this point, when the cache access from the CPU 10 is performed, an access address is output to an address bus 23, then its portion, column address 23*a*, is used for reading the cache address and its attribute E, S, and R from the address array 31, and these information are sent into the input of the cache operation control circuit 21. At the same time, this column address 23*a* is used for reading corresponding data from the data array 35 to send them to the data bus 24.

To this control circuit 21, the CPU command will be sent. In addition, the upper portion 23*b* other than the column address of the main memory address specified by the CPU 10 will also be sent.

Figure 4:
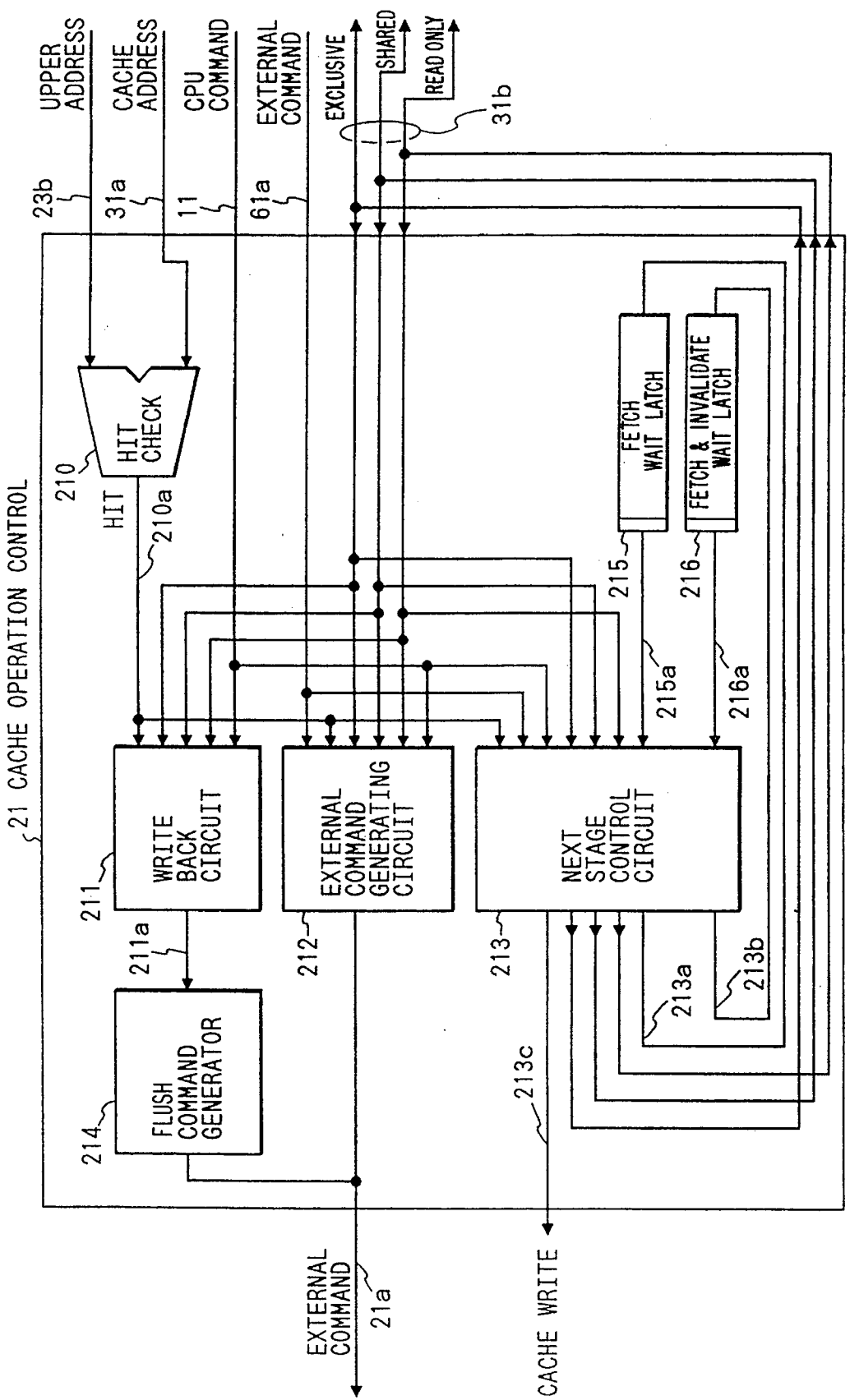
FIG. 4 is a schematic diagram indicating a detailed structure of a cache operation control circuit in FIG. 1C.

Referring now to FIG. 4, as shown in the figure, the cache operation control circuit 21 comprises a cache hit control circuit 210, a cache write-back control circuit 211, an external command generator circuit 212, a next state control circuit 213, and FL command generator circuit 214 and so on.

(1a1) Hit Control Circuit 210

Hit control circuit 210 is a circuit for determining whether data designated by the main memory address supplied from CPU 10 is cached in the cache 30.

In the above example, for a READ command from CPU 10, the hit control circuit 210 compares the upper address 23*b* of the access address from CPU with cache address 31*a* read from the address array 31 to determine hit/mishit of the cache.

(1a2) External Command Generate Circuit 212

External commands generating circuit 212 generates external commands 21*a* based on the results of determination by the hit control circuit 210, the command from CPU 10 or external PU, and the state information E, S, and R of the accessed cache line. The operation of this circuit is shown in FIG. 5.

When a READ command from CPU 10 for reading the main memory is determined in the hit control circuit 210 to be a cache-hit, and any one of E, S, or R of the accessed cache entry is not zero, i.e., this entry is not invalid, data requested by the CPU 10 is to be cached in the cache 30 as valid data. Then the data read from the cache is sent to the CPU 10 through data bus 24. Other circuits such as the external command generate circuit 212 will not operate in this situation.

When the hit control circuit 210 determines that the command is a cache-hit, but E, S, and R of the accessed cache entry are all zeroes, that is, this entry is invalid, or when the command is determined to be mishit of the cache, data requested by the CPU 10 is not to be cached in the cache 30 as valid data. The external command generator circuit 212 generates a FETCH(A, R) command (referred to as F command herein below for simplicity) for fetching data requested by the CPU 10 from the distributed main memory of one of the PU's. More specifically, the circuit 212 sends a command code indicating the FETCH command into a command packet construction circuit 62 to instruct the construction of a packet including this FETCH command.

This external command requests to read a data line including the main memory address "A" and to send back the data to the PU number "R". In the embodiment described above, a main memory address specified in the READ command by the CPU 10 is used for "A". This main memory address is sent back to the packet construction circuit 62 via the bus 23. In addition, the number of the PU that this CPU belongs to is held in a register 22 from which the PU number is sent to the construction circuit 62. Furthermore, the upper 16 bits of the main memory address on the bus 23 specified by the CPU 10 is selected by a selector 25, sent to the construction circuit 62 to be used therein as the destination PU number of the generating packet.

(1a3) Next State Control Circuit 213

Next state control circuit 213 is a circuit which determines the new value of the cache states E, S, and R of the accessed cache line after access according to the results of the examination by the hit control circuit 210, the current cache state of E, S, and R, and the input CPU command or external command. This circuit also writes the state information indicating the determined latest state into the entry in the accessed address array 31. The operation of this circuit is shown in FIG. 6.

At the main memory read request of the CPU discussed here, when a packet including a FETCH command is sent to the network as mentioned above, a reply command corresponding to this request will be sent to the requesting PU, as will be discussed below. During this period of the time, the next state control circuit 213 sets an F latch 215 and waits for the reply command (F waiting state).

(1b) Network I/O circuit 60

The network I/O circuit is comprised of two parts 60A and 60B respectively shown in FIG. 1B and FIG. 1C. As will be appreciated from these figures, the network I/O control circuit 60 includes two command packet deconstruction circuits 61 and 63 for deconstructing packets including commands (referred to as "command packet"), two command packet construction circuits 62 and 64 for constructing packets from commands, and a packet transmitter circuit 66 and a packet receiver circuit 65 which are connected to the network 800.

The command packet construction circuits 62 and 64 are, respectively, packet construction circuits for the cache and for the distributed main memory, each circuit generating packets including external commands specified by the cache control circuit 20 and the distributed main memory control circuit 50, respectively.

The command packet deconstruction circuits 61 and 63 are respectively packet deconstruction circuits for the cache and for the distributed main memory. The packet receiver circuit 65 determines, upon receipt of a packet from the network 800, whether the command in the packet is for the cache or for the distributed main memory from the command code within the packet, to send the received command packet to the command packet deconstruction circuit 61 if the command is for the cache, or to send the received packet to the command packet deconstruction circuit 63 if the received command packet includes a command for the distributed main memory. The command packet deconstruction circuit 61 deconstructs command packets supplied from the packet receiver circuit 65 and supplies the results of deconstruction to the cache control circuit 20. The command packet deconstruction circuit 63 deconstructs command packets supplied from the packet receiver circuit 65 and supplies the results of deconstruction to the distributed main memory.

Referring now to FIG. 8, there is shown a generic style of packet generated by the packet construction circuit 62 or 64. The packet includes destination PU number 701, packet length 702, external command code 703, main memory address to be accessed 704, accessing PU number 705, and data field (such as data to be written or accessed data line) 706. It should be noted that some external commands do not use all of these fields. For example, accessing PU number 705 is not included in some external commands. For the FETCH command discussed above, data field 706 is not included. According to the command code supplied by the external command generator circuit 212 or 514, the packet construction circuit 62 or 64 determines which field of data has to be used. Data indicating packet length 702 is determined at the construction circuit 62 or 64. For the purpose of explanation and simplicity, the inside of these circuits is not shown.

When the command code indicating the FETCH command discussed above is supplied from the external command generator circuit 212, the command packet construction circuit 62 receives from the cache control circuit 20 the information necessary to generate a packet including the FETCH command, as discussed above with reference to the external command generate circuit 212, and according to that information, the circuit generates a packet including the FETCH command.

In the specification below, the portion indicating the command body such as command codes included in the packet will be referred to as external command, and the packet will be referred to as command packet, or simply external command, or command.

If the destination PU number of the packet to be sent is different from the source PU number, then the packet transmission circuit 66 send the packet to the network. If the destination PU number is the same to the source, then the packet transmission circuit sends the packet directly through line 66b to the packet receiver circuit 65.

When the receiver circuit 65 in a home PU receives a command packet including FETCH command, as the FETCH command in the command packet is for the distributed main memory, the command packet deconstruction circuit 63 deconstructs the packet. Each deconstructed field of the packet will be sent to the distributed main memory control circuit 50.

(1c) Distributed Main Memory Control Circuit 50 in the Home PU

If the command packet received by the network I/O circuit 60 contains a command requesting some process on the distributed main memory, the command packet deconstruction circuit 63 deconstructs the command. According to the deconstruction, the main memory address 53, command code 63a, accessing PU number 63b, and data 54 will be output. The external command code 63a will be sent to the distributed main memory operation control circuit 51 in the distributed main memory control circuit 50. The main memory address 53 will be sent to the distributed main memory 40 through an address bus 53. The accessing PU number will be supplied to the directory control circuit 52. If the deconstruction circuit outputs any data, then the data will be sent to the distributed main memory 40 through a data bus 54. For the FETCH command described above, data will not be output from the deconstruction circuit 63.

(1c1) Distributed Main Memory Operation Control Circuit 51

The distributed main memory operation control circuit 51 in the distributed main memory control circuit 50 is triggered by an external command 63a to start operation. The circuit 51 responds to the external command sent from other PU's through the network 800 or from the cache control circuit 20 in the same PU through the network I/O circuit 60, and reads a main memory state RO and C at the memory location in the address specified by the external command, and also a data line or directory stored in that location, in order to perform the process specified by the input external command according to the main memory state. The directory control circuit 52 in the distributed main memory control circuit 50 will generate a new directory to be written in the distributed main memory 40.

Figure 9:
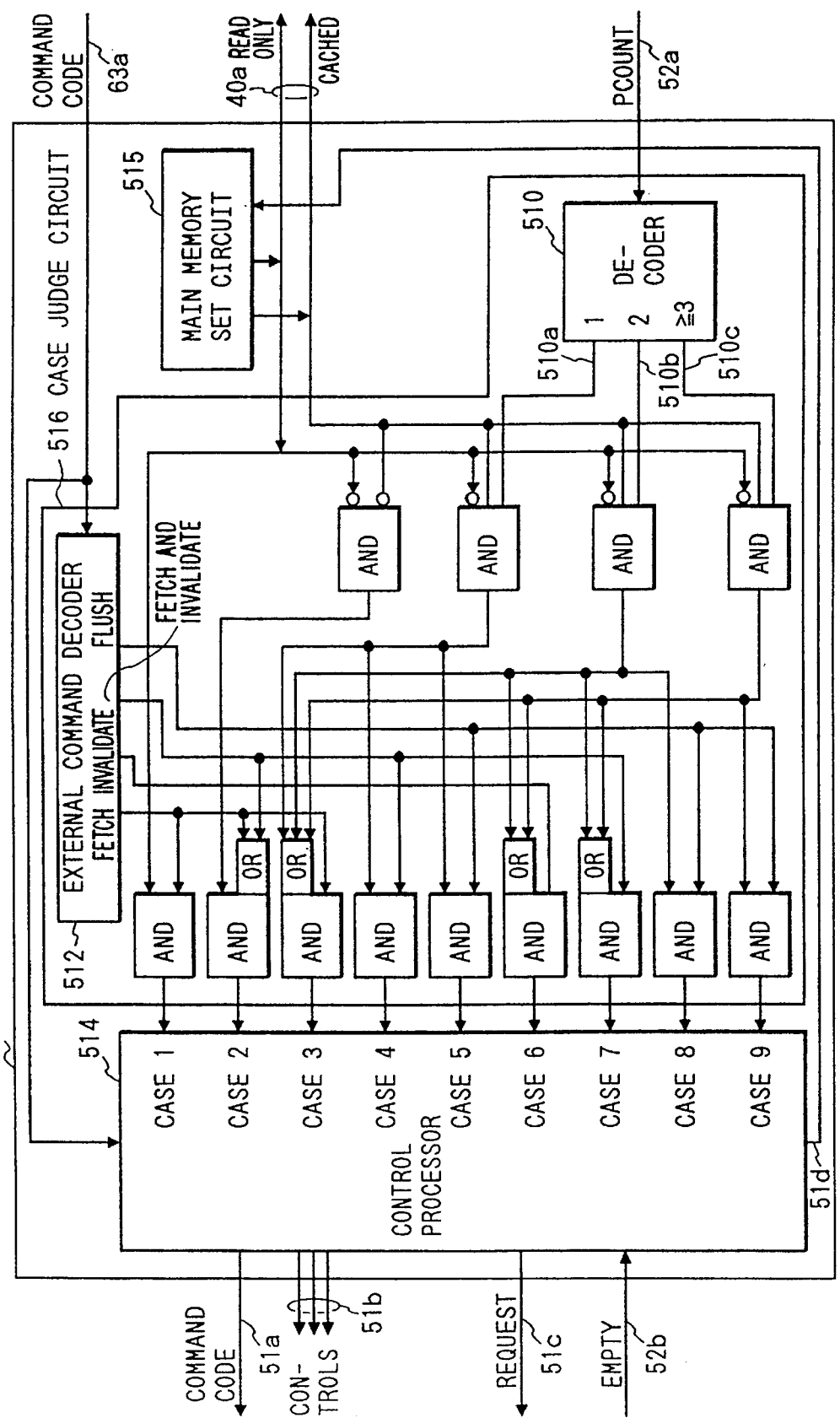
FIG. 9 is a schematic diagram indicating detailed structure of distributed main memory control circuit of the embodiment.

As shown in FIG. 9, the distributed main memory operation control circuit 51 contains a control processor 514 to perform the process specified by external commands, a case control circuit 516 for determining which operation is to be performed by the control processor 514, and a main memory state control circuit 515 which update the main memory state RO and C after performing external commands.

First of all, the control processor 514 respond to the input external command 63a to generate a read request through line 51c to the distributed main memory.

At this time the intact main memory address supplied from the command packet deconstruction circuit 63 through the address bus 53 is used as default address. After this reading operation, the state bits C and RO of the memory location specified by the main memory address on the address bus 53 will be supplied to the case control circuit 516 and the main memory state control circuit 515 in the distributed main memory operation control circuit 51. Similarly, data or a directory at this memory location will be read out through the data bus 54 to the directory control circuit 52. As will be further described below, when a directory is read out from this memory location, the directory control circuit 52 is structured so as to calculate the total number of PU's caching the data of this memory location, according to the directory and outputs it to the line 52a.

For the control circuit 516, a decoder 510 classifies the value of the cached PU number PCOUNT into three classes of 1, 2, or 3 or more. The external command 63a will be classified by an external command decoder 512 into four classes including FETCH command (F), INVALID command (I), FETCH and INVALID command (FI), and FLUSH command (FL). I, FI, and FL commands will be explained later.

In the circuit 516, control logic as shown in the figure determines the operative condition of the control processor 514 by using the main memory state C and RO, read from the distributed shared main memory through the line 40a, and the output of decoders 510 and 512. The operative condition may be classified into 9 cases, from case #1 to case #9. For the FETCH command described above, one of the following three cases may be selected:

Case #1: the RO bit is "1", that is, the data line designated by the external command is read only data.

Case #2: the R0 bit is "0" and C bit is "0", that is, the data line designated by the external command is not read only data, and at the same time there is no PU in which the data line has been cached.

Case #3: the RO bit is "O" and C bit is greater than or equal to "1", that is, the data line designated by the external command is not read only data, and at the same time there is one or more PU's in which the data line has been cached.

In the embodiment, one of the following three commands is employed as a reply command to the FETCH command.

DATA (A,DL)

DATACACHE (A,DL)

DATARO (A,DL)

Here DL is a data line associated with the main memory address "A".

In this embodiment, as will be further explained in greater details later, when any PU caches a data line at a given memory location in the distributed shared main memory, the directory indicating the caching PU will be held at that memory location, instead of the data line itself.

The command DATA among the above three external commands is used by the home PU for transmitting the data line from the distributed shared main memory of the home PU, when the data line requested by the CPU is not read-only, and that data is stored in the distributed shared main memory 40 of the home PU (not cached by any PU).

The external command DATACACHE is used when the data line requested by the CPU is already cached in a PU, and the data line is transferred from the PU.

The external command DATARO is used by the home PU when the data line requested by the CPU is read-only. (Case #1)

The operation of the apparatus of the present invention in the case #1 will be now described.

In this case, the data line of the accessed memory location in the distributed shared main memory 40 is read-only. In this preferred embodiment, the data line at this memory location is transferred to the accessing PU. Neither directory will be generated for this data line, nor will the data line at this memory location be replaced with a directory.

Thus, the control processor 514 sends to the accessing PU the command DATARO (A,DL) comprising the data line DL read from the distributed shared main memory 40 and the main memory address A of the data line.

Accordingly, the control processor 514 sends the command code indicating command DATARO to the command packet construction circuit 64 in the network I/O circuit 60 through line 51a, to instruct the construction of a packet comprising this command. For the data line DL used in the command, data already sent on the data bus 54 is transferred to the construction circuit 64. Also, for the main memory address A used in the command, a main memory address supplied from the command packet deconstruction circuit 63 is sent to the construction circuit 64 through the address bus 53. In addition, for the information specifying the PU to send the command, the accessing PU number output from the command packet deconstruction circuit 63 is sent to the construction circuit through selector 55. As a result, the command DATAR0 is generated by the construction circuit 64, so that the packet including the DATAR0 command will be sent by the packet transmitter circuit 66 through the network 800 to the PU which sent the packet including the FETCH command, as the reply to the FETCH command.

In case #1, the control processor 51 does not update the main memory state bits C and R, nor does the directory control circuit 52 perform any operation.

As described above, the distributed shared main memory operation control circuit terminates the operation of case #1.
(Case #2)

In case #2, as there is no PU which already cached the data line at the accessed memory location, the latest data line exists only on the distributed shared main memory 40. Accordingly the control processor 514 sends to the accessing PU, a command DATA (A,DL) including a data line DL read from the distributed shared main memory 40, and the main memory address A of the data line.

Thus, the control processor 514 sends a command code indicating the DATA command to the command packet construction circuit 64 in the network I/O circuit 60 through line 51a in order to instruct the construction of a command packet including this command. After that, the operation from the construction of the command packet to the transmission of the packet is the same as case #1. The difference of case #2 from case #1 is that the control processor 514 updates C bit of the main memory state bits (C and R0) in the distributed shared main memory 40, and that the directory control circuit generates a new directory in this case.

This means that the control processor 514 instructs the main memory state control circuit 515 through line 51d to update the main memory state bit C. The circuit 515 sends R=0, and C=1 to the distributed shared main memory 40 through a line 40d.

The control processor 514 also sends a control signal for generating a new directory to be written at the accessed memory location in the distributed shared main memory through the line 51b to the directory control circuit 52. As will be further explained later, the directory control circuit 52 generates a directory indicating that the data line at the accessed memory location is cached on the PU designated by the accessing PU number which is supplied from the command packet deconstruction circuit 63 through line 63b, so as to send it to the distributed shared main memory 40 through the data bus 54.

The control processor 514 further sends a write request through line 51c to the distributed shared main memory 40 to write the updated main memory state bits C and R0, and the newly generated directory into the accessed memory location. Then the distributed shared main memory operation control circuit 51 terminates the operation in case #2.
(Case #3)

In this case, as there is more than one PU which has already cached the data line at the accessed memory location in the distributed shared main memory 40, the operation of the above mentioned case #2 had to already have been performed at this memory location. Thus, placed at this memory location is a directory, not a data line. Thus, the control processor 514 requests for one of PU's having cached this data line to transfer the data line requested by the FETCH command to the accessing PU. More specifically, the control processor 514 sends a command REQ (A,R) comprising an accessed address A and accessing PU number R to one of the PU's.

To do this, the control processor 514 sends the command code indicating this command REQ to the command packet construction circuit 64 through line 51a in order to instruct the construction circuit 64 to construct a packet including this command. The operation from the construction of the packet including the command to the transfer of the packet thereafter is similar to the above mentioned cases #1 and #2. It should be noted that in this case #3, the selector 55 will operate so as to obtain the destination PU number from a priority encoder 525 of the directory control circuit to send the packet to one of PU's which has cached the data line.

However, the operation of the control processor 514 about the update of the main memory state bits C and R0 or the update of directories will be different from case #2.

That is, in this case, the control processor 514 instructs the main memory state control circuit 515 not to change the main memory state bits C and R0 through line 51d. The circuit 515 sends the original bits R=0 and C=1 to the distributed shared main memory 40 through line 40d without modification.

In case #3, the directory is already read out from the accessed memory location in the distributed shared main memory 40 to the data bus 54. The control processor 514 has to update this fetched directory so as to indicate that the accessing PU has newly cached a data line. To do this, the control processor 514 sends a control signal for generating a new directory at the accessed memory location in the distributed shared main memory to the directory control circuit 52 through line 51b.

As will be further described later, in case #3, the directory control circuit 52 modifies the directory already read from the distributed shared main memory 40 so as to indicate that the data line at the accessed memory location in the distributed shared main memory 40 is cached, to the accessing PU indicated by the PU number supplied from the command packet deconstruction circuit 63 through line 63b, and followed by sending the modified directory to the distributed shared main memory 40 through data bus 54. The control processors 514 sends a write request to the distributed shared main memory 40 through line 51c, in a similar way to case #2 described above, to write the unmodified main memory state bits C and R0, and the modified directory into the accessed memory location.

Then the distributed shared main memory operation control circuit 51 terminates the operation in case #3.
(1c2) Directory Control Circuit 52 in the Home PU This circuit generates new directories to provide them through bus 54 to the distributed shared main memory 40, or to modify the generated directories read from the distributed shared main memory 40, and after modification to provide the modified directories through bus 54 to the distributed shared main memory 40.

It should be noted that in this embodiment, the directory to be stored at each memory location in the distributed shared main memory 40 is a bitmap that has one bit for each PU for indicating that the associated PU already cached the data line of a given memory location to the PU, as shown in FIG. 2.

Figure 10:
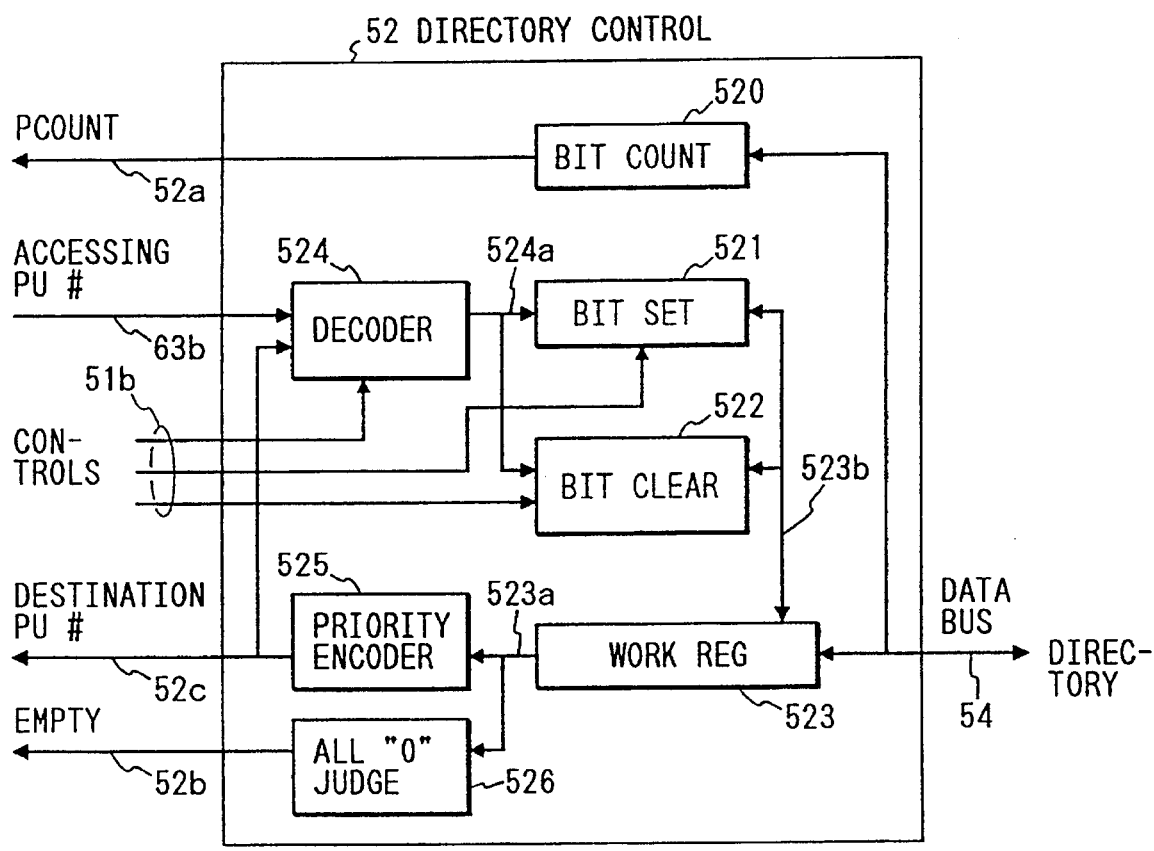
FIG. 10 is a schematic diagram indicating detailed structure of the directory control circuit shown in FIG. 9.

FIG. 10 shows detailed diagram of the directory control circuit 52.

When a directory is read out from a memory location in the distributed shared main memory 40 to the bus 54, a bit counter 520 counts the number of bits that the value in this directory is 1. This value is used as the total number PCOUNT of PU's which has cached the data line located at the memory location, and PCOUNT is sent to the case control circuit 516 in the distributed shared main memory operation control circuit 50 through line 52a. If the information fetched from the distributed shared main memory 40 to the bus 54 is not a directory but a data line, the output of the bit counter 520 has no significance, so that in this condition the case control circuit 516 does not use the PCOUNT.

A work register 523 holds the directory supplied from the bus 54. A bit set circuit 521 is a circuit for setting 1 to an appropriate bit location of the directory held by the work register 523. A bit clear circuit 522 is a circuit for clearing an appropriate bit location of the directory held by the work register 523.

A decoder 524 specifies the bit location to be set or cleared by these circuits 521 and 522. The bit location will be specified by the accessing PU number supplied from the packet decomposition circuit 63 or by the output from the priority encoder 525. The priority encoder 525 is a circuit for determining the PU to be accessed based on the directory in the work register 523. Additionally, an all zero control circuit 526 determines whether or not the contents of the work register is all zeroes, and provides the EMPTY signal to the control processor 514 in the distributed shared main memory operation control circuit 51.

The operation of the directory control circuit 52 is controlled by the control signal 51b provided by the control processor 514 in the distributed shared main memory operation control circuit 51.

For the FETCH command described above, when the control processor 514 accesses a memory location in the distributed shared main memory 40 as described above, the work register 523 holds the directory stored therein through the bus 54. The bit counter 520 counts the total number of bits of which the value in the directory on the bus is 1, puts the count into the total caching PU number PCOUNT, and sends it to the case control circuit 516 in the distributed shared main memory operation control circuit 51 through line 52a, in order to use it for the case control.

When the case control determines that it is case #1, the data line at accessed memory location in the distributed shared main memory 40 is a read-only data line, so that the directory control circuit 52 does not perform a specific operation.

When the case is determined to be #2, at the memory location specified by the FETCH command, a data line is held, so that the directory control circuit 52 generates a new directory to be written in the specified memory location. That is, the decoder 524 decodes the accessing PU number provided from the command packet deconstruction circuit 63 to generate a directory that has the value 1 in the bit location corresponding to the PU number, and the bit set circuit 521 sets the newly generated directory into the work register 523. The directory set into the register is written to the distributed shared main memory 40 through bus 54. The write operation is the same as described with reference to the distributed shared main memory operation control circuit 51.

When the case is determined to be #3, as a directory is already held at the memory location specified by the FETCH command, the directory control circuit 52 generates a destination PU number to which to send the external command REQ generated by the distributed shared main memory operation control circuit 51. Thus, the priority encoder 525 encodes the bit location where the value in the directory fetched from the distributed shared main memory 40 to the work register 523, is 1 in order to generate the destination PU number. If there is a plurality of bit locations where the value is 1, the priority encoder 525 selects one of them according to the predetermined priority order. In this embodiment, the priority order is predetermined so as to output the PU number of the smaller value first. In addition, the bit set circuit 521 sets 1 to the bit location corresponding to the accessing PU number in the work register.

Then the directory control circuit 52 terminates the operation for the FETCH command.

(1d) Cache Control Circuit 20 in another PU having cached data line

The command packet which includes REQ command which is generated in case #3 described above is transferred to the cached PU through the network 800. In that PU, the network I/O circuit 60 provides the results of packet deconstruction to the cache control circuit 21. That is, the main memory address included in the command packet is provided to the cache 30 through the address bus 23, so that the cache 30 is accessed in a similar way as the cache access from CPU 10. Since the cache hit by the access will occur in this case, the external command generating circuit 212 in the cache operation control circuit 21 sends the command code indicative of the external command DATACACHE to the command packet construction circuit 62 to instruct generation of a packet including this command, in order to transfer the data line held in the hit entry in the cache to the cache of the accessing PU.

The data line to be included in the command as the operand DL of the command DATACACHE (A, DL) is sent from the cache 30 through the data bus 24 to the command packet construction circuit 62, and the address to be included in this command included in the received external command REQ as the main memory address A is sent through the address bus 23 to the command packet construction circuit 62. Also, the accessing PU number included in the received command REQ is selected by the selector 25 as the PU number indicative of the destination of the packet and is sent through line 25a to the command packet construction circuit 62. A packet including the command DATACACHE is generated by using these items to be transferred through the network 800 to the accessing PU.

The next state control circuit 213 in the cache control circuit 20 changes the cache state to nSn (Shared), if the cache state for the cache entry accessed by the external command REQ is "E" (Exclusive). However the cache state is not changed if the cache state is "S".

(1e) Cache Control Circuit in the accessing PU (part 2)

As the reply to the packet including the FETCH command described herein, when any one of the aforementioned command DATA, DATACACHE, or DATARO is transferred through the network 800 to the PU sending the FETCH command, the packet receiver circuit 65 in that PU transfers the received packet to the command packet deconstruction circuit 61 to thereby deconstruct the received command packet.

For the main memory read request from the CPU described herein, after having transferred the packet including the FETCH command to the network as described above, the next state control circuit 213 sets the F latch 215 in a waiting state (F waiting state), until a reply command packet is transferred to the requesting PU.

When the F latch 215 is ON (i.e., waiting reply to the F command), if any reply command is transferred from the network 800, the next state control circuit 213 determines the next state of the cache entry which is accessed, depending on the command code as follows:

If a reply is DATARO, then the line is read-only. The next state of the cache will be R=1 (read-only).

If any data is replied by DATA command, this is because data is sent back from the home PU, then other caches do not cache the data. Therefore the next state of the line in the cache will be E=1 (Exclusive).

If any data is replied by the DATACACHE command, the data is shared because the data line is supplied from another cache. Therefore the next state of the cache will be S=1 (Shared).

The circuit 213 sends the state information determined as above through line 31b to the cache 30, as well as the write request through line 213c to the cache 30. From the command packet deconstruction circuit 61, data in the received packet and its main memory address are transferred to the cache 30 through data bus 24 and address bus 23, respectively. As such, the determined state information along with data included in the received command from the network 800 will be written in a column corresponding to the main memory address in the received packet (this address is equivalent to the main memory address specified by the CPU 10 that generates the main memory read request).

At this point, the data line in the cache should have been replaced by the cache write-back control circuit 211 and if necessary, by the FL command generating circuit 214 as described later in greater details. The operation of these circuits will be explained with reference to the processing of the FLUSH command.

This ends the description of the processing of the main memory read command from the CPU 10.

(2) Data Writing Operation to the Main Memory (2a) Cache Control Circuit 20 in the Accessing PU For the WRITE command from CPU, the cache is accessed in a similar way as the READ command. The hit control circuit 210 in the cache operation control circuit 21 also checks the cache hit in this case, then the following operation will be performed by the external command generating circuit 212 and the next state control circuit 213, by using the results of the check and the cache state bits E, S, and R read from the cache 30.

If the cache 30 has been hit, and the state of the data line of the hit cache column is "E", then the data line may be arbitrarily modified because it is not cached by another PU. Thus the writing data from the CPU 10 will be transferred through the data bus 24 to the data array 35 of the cache 30 so as to be written in the hit cache column, however the external command will not be output and the cache state will not be modified.

If the cache 30 has been hit, and the state of the data line of the hit cache column is "S" then the data line is cached in another PU. Therefore, if this data line in the cache in the PU which issued the WRITE command is modified, the inconsistency will occur between the modified data line and the data line of the same main memory address held in the cache of one or more of the remaining PU's. In this embodiment, the data line in those other PU's will be invalidated in order to avoid any inconsistency. To do this, the external command generating circuit 212 sends the command INVALIDATE (A, R) (referred to as "I command") to the home PU. The command should be forwarded to the data line in the cache of other PU's.

The operand A is the main memory address specified by the WRITE command, and R is the number of the PU which issued the WRITE command.

Then, the next state control circuit 213 outputs E=1 as the next state of the cache, and writes the writing data provided from the CPU 10 to the cache 30.

When the cache mishits, or when the cache hits but the hit data line is in the state "I", it will be necessary to request for another PU to provide the accessed data line and to invalidate all of the copy of the data line in other PU's, for maintaining the cache coherency. To do this, the external command generating circuit 212 instructs the command packet construction circuit 62 to send a command FETCH_AN_INVALIDATE (A, R) (referred to as command "FI," for simplicity) to the home PU. The meaning of the operands A and R are identical to that of I command.

The next state control circuit 213 sets FI latch 216 in the waiting state to wait the arrival of a reply command to the FI command.

Either one of DATA or DATACACHE will be sent to the accessing PU later as a reply command to the FI command, similar to the case of the F command. However, the DATARO command is not sent as a reply command.

When FI latch is set, if one of these reply commands has arrived, the next state control circuit 213 will determine the next state of the cache column specified by the reply command. If the reply command is DATA or DATACACHE, the next state will be "E" because no replicated data line having the same main memory address is cached in any other PU's as valid data. The next state control circuit 213 then writes the determined next state and the data line sent along with the reply command to the cache 30, and writes the write data provided by the CPU 10 to the cache 30 thereafter.

(2b) Distributed Shared Main Memory Control Circuit 50 in the home PU (When received command is I command)

When the I command described above is transferred from the PU having issued the WRITE command to the home PU, this circuit 50 will operate as follows.

Case #4: RO of the data line specified by I command is O and the number of PU's caching that data line, PCOUNT, is more than 2. It should be noted that if the number of caching PU's PCOUNT is 1, then I command will not send to the distributed shared main memory control circuit 50 because the data is exclusive.

If the number of caching PU is more than 2 and I command has arrived, then it is necessary to invalidate all of the data with the accessed address in the cache of the PU's other than the accessing PU. In general, as the number of caching PU's is plural, the INVALIDATE CACHE command must be sent to a plurality of PU's by performing the transmission repeatedly. To do this, the control processor 514 repeatedly instructs for the command packet construction circuit 64 to repeatedly issue the command INVALIDATE CACHE (A) (referred to as INVC for simplicity).

The main memory address provided by the packet deconstruction circuit 63 as the result of deconstruction of the I command is used for the address A in the INVC command.

The address is provided from this circuit 63 through the bus 53 to the command packet construction circuit 64.

The destination PU number of the command INVC is specified by the directory control circuit 52 as follows:

For the I command, in the same way as for F command, the directory is read from the distributed shared main memory 40 through data bus 54 during the initialization operation of the distributed shared main memory operation control circuit 51.

The directory control circuit 52 loads this directory information to the work register 523, then the decoder 524 and the bit clear circuit 522 will clear the bit corresponding to the accessing PU number 63b specified by the I command, among a plurality of bits in this directory. Thereafter, the bit locations of a plurality of value of 1 indicated by the cleared directory are selected in the order that the location corresponding to the smaller PU number is selected first. The encoder 525 generates a PU number corresponding to one selected bit location, then the PU number is output to the command packet construction circuit 64 as the destination PU number of the command INVC through line 52c, selector 55, and line 55a.

In addition, each time one bit location of value 1 from the directory in the work register 523 is selected by the priority encoder 525, the bit location in the work register 523 is cleared to value 0 by the decoder 524 and the bit clear circuit 522. Accordingly, by repeating the similar operation on the cleared directory, the priority encoder 525 outputs the PU number of still another PU which caches the data line specified by the I command. This operation will be repeated until the directory in the work register 523 becomes all zeroes.

When the all zero control circuit 526 detects that the directory is all zeroes, it notifies a signal EMPTY to the control processor through line 52b. The control processor 514 repeatedly instructs the construction of INVC command until the signal EMPTY is notified.

At the time the signal EMPTY is sent, the decoder 524 and the bit set circuit 521 in the directory control circuit 522 write new directory in the work register 523 in which the bit location corresponding to the accessing PU number provided through line 63b is set to 1. This new directory is written to the distributed shared main memory 40 by the writing instruction from the control processor.

Thus the operation in case #4 will be terminated.
(When received command is FI(FETCH_AND_INVALIDATE) command)

When the FI command described above is transferred from the PU which issued WRITE command to the home PU, the circuit 50 performs one of the following two operations:

(Case #5): RO of the data line specified by the FI command is 0, and the number of PU caching this data line, PCOUNT, is 1.

(Case #6): RO of the data line specified by the FI command is 0, and the number of PU caching this data line, PCOUNT, is 2 or more.

In case #5, it is necessary to request for one PU which caches the data line specified by the FI command to transfer the data line specified by the FI command to the accessing PU, as well as to request to invalidate the data on that PU. To do this, the control processor 514 of the main memory operation control circuit 51 in the home PU requests the command packet construction circuit 64 to construct a packet including a command REQUEST_&_CACHE_INVALIDATE (A, R) (referred to as REQINVC for simplicity).

The operand A is a main memory address specified by the FI command, and R is an accessing PU number. Both operands are provided from the packet deconstruction circuit 63 to the packet construction circuit 64.

The destination PU number of this command is generated by the priority encoder 525 of the directory control circuit 52 in the same way as the INVC command.

However, for a FI command, since the accessing PU which generated this command does not cache the address data specified by this command, the directory control circuit 52 has no need to clear the bit corresponding to the accessing PU number 63b in the directory loaded from the distributed shared main memory 40 to the work register 523. Moreover, since in case #5, there is one PU which caches this data line, the priority encoder 525 generates the PU number for the unique PU according to this directory to output the PU number to the command packet construction circuit 64 through line 52c as the destination PU number of the command REQINVC.

After that, the directory control circuit 52 generates a directory that the value of the bit location corresponding to the accessing PU is set to 1 as the directory after REQINVC operation in the work register 523, then writes back to the distributed shared main memory 40.

In case #6, after REQINVC command has been sent to one of the PU's caching the data line specified by FI command in the similar way to the operation of the case #5, INVC (A) command is sent to other PU's caching this data line. As the operation of the directory control circuit 52 is the same as the case of the I command, further details of the operation will not be described in this specification.
(2c) Other PU's caching the accessed data line Other PU's which receive the command INVC from the home PU will invalidate the data line specified by the command in the cache 30 by using the cache memory control circuit 20.

Other PU's which receive the command REQINVC from the home PU will issue command DATACACHE (A, DL) for sending the data line DL specified by the command, to the cache of the PU specified by the command, will then invalidate the data line in the cache.
(3) Write Back of the Data Line into the Main Memory
(3a) Cache Control Circuit 20 in the Accessing PU When the cache 30 is accessed from CPU 10 for READ command or WRITE command as described above, if caching does not hit, then the data line is newly transferred from either the home PU or a PU that already cached that data line to the cache in the accessing PU, as described above. At this time, the data line already stored in the cache must be replaced with the transferred data line to be held therein. Depending on the cache state of the data line to be replaced, the data line may have to be written back to the distributed shared main memory in the home PU.

In addition, when the FLUSH command has been directly output from the CPU 10, it will be necessary to write back the data line of the column specified by the CPU command to the main memory. In the following description, the write back operation to the main memory along with processing of the WRITE or READ command, and the write back operation to the main memory by the FLUSH back command from CPU 10 will be described.

When storing the data line of the address actually requested by the CPU 10, write back control circuit 211 determines whether or not the write back operation to the main memory, of the original data line stored at the cache is required. FIG. 7 shows this operation.

If the cache state of the data line already stored in the corresponding column address is E, then it is necessary to write back the data line into the main memory, when the data line has come to be replaced.

If the cache state of the data line is "S", then the data line exists in other PU's. So, no write back operation is required for that data line. It will be at least necessary, however, to notify to the home PU that the data line is no longer in the PU as a valid data line, in order to update the directory thereof. In this embodiment, for the purpose of simplifying the control, an FL command is issued in this case and the home PU determines whether the operation required is either the actual write back or the directory update only, according to the directory information.

If the cache state is R, then the write back of data is not required because the directory control is not performed in the main memory.

Also, if the cache status is I (Invalid), that is, all of cache information items E, S, and R are zero, then the write back is not needed.

When the cache write back control circuit 211 determines whether the write back is needed, a notification is sent to the FL command generating circuit 214 by using signal 211a and the FL command generating circuit instructs the packet construction circuit 62 to send FLUSH command (A, DL) (referred to as FL command for simplicity) by using external command output signal 21a. At this time, the cache address 31a is output from the address array 31 to the address bus 23, in order to be used for the address A of the FL command. For the lower address of the FL command, the column address is used. For data line (DL) operand of the FL command, the data line read from the cache 30 is supplied through the data bus 24 to the command packet construction circuit 62. For the destination PU number of the FL command, the PU number field in the cache address 31a is provided through the address bus 23 and the selector 25. The FL command will be issued from the external command generate circuit 212 before other commands described before such as FETCH command, as described above.

(3b) Distributed Main Memory Control Circuit 50 in the Home PU

When receiving FL command, the home PU performs either one of following case #7 to #9. In either cases, the main memory state RO for the memory location specified by the FL command in the distributed shared main memory 40 is NOT 1.

(Case #7): The PU number PCOUNT of PU's which cache the data line specified by the FL command is 1.

(Case #8): The PU number PCOUNT is 2.

(Case #9): The PU number PCOUNT is 3 or more.

In case #7, when the number of PU's which already cache the data line specified by the FL command, PCOUNT, is 1, then the data line is not stored in any other PU than the PU which issued the FL command, so that it will be necessary to write back the data line by replacing the directory held in the distributed shared main memory 40 with the data line sent by this command.

Thus, the control processor 514 instructs the main memory state control circuit 515 so as to reset the C bit of the main memory state of the data line, specified by this command in order to write the data line included in the FL command into the distributed shared main memory 40.

In case #8, as there remains one PU which caches the data line specified by the command other than the PU which has issued the FL command, there is no need to write back the data line included in this command to the distributed shared main memory 40. Therefore in this case, the directory is updated so as to clear the bit for the PU which issued the FL command.

Furthermore, EXCLUSIVE (A) command (referred to as command EX for simplicity) is generated in order to notify to the another PU that the data is exclusive.

To do this, the directory control circuit 52 clears the bit corresponding to the accessing PU within the directories loaded into the work register 523. The output of the priority encoder 525 for the updated directory is used for the destination PU number of the command EX and the command EX is set to the another PU. Additionally, the updated directory will be written back to the distributed shared main memory 40.

The PU upon receipt of the command EX modifies the cache status of the data line specified by the command to "E".

In case #9, as there are a plurality of PU which cached the data line specified by the FL command, only the update of the directory as described in case #8 above is performed.

(4) COMPARE_AND_SWAP command

As the operation of this command is similar to that of WRITE command, no more details will be described here.

(Modified embodiments)

Figure 11:
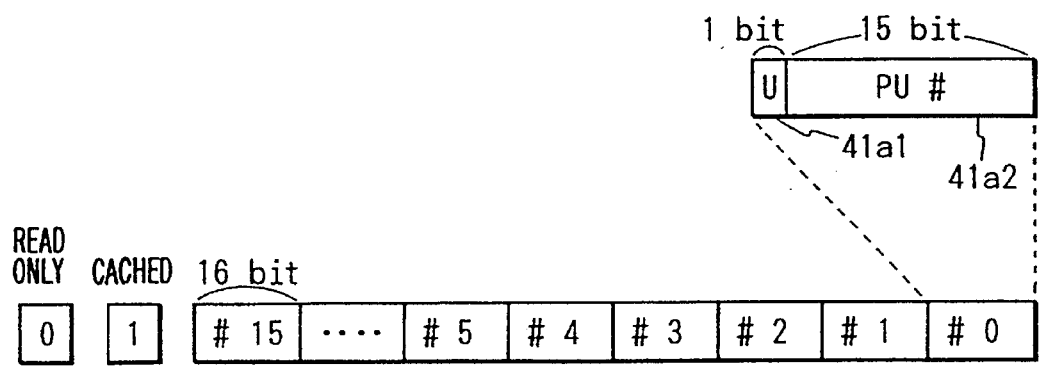
FIG. 11 is a schematic diagram indicating bit structure of a directors in the pointer scheme.

(a) In the above described embodiment, the bitmap shown in FIG. 2 is used for the directory to be held in the distributed shared main memory. However, the pointer scheme may be used instead, in which caching PU is indicated by the encoded PU number. FIG. 11 shows an example of the directory structure using the pointer scheme. In this figure, there are 16 directory entries, each entry comprises 15 bits for indicating the PU number, and 1 bit indicates whether the entry is used or unused. In this example, the maximum PU number is 32768, allowing significantly larger number of PU to be handled. It should be noted that, when the pointer scheme is used, if the number of PU's caching the same data line at the same time is more than 16, it will be necessary to issue a command to invalidate the data line for any one of those 16 PU's so as to limit the total number of PU's holding the same data line at the same time.

(b) In the above described embodiment, the data coherency between caches is maintained by invalidation (deleting copies of the written data in other caches). However, it may be possible to implement the directory control scheme of the present invention using the cache which maintains cache coherency by means of the updating instead of invalidation. In the update scheme, the data in the cache of other PU's are updated so as to indicate the latest data.

(c) Above embodiments comprise a plurality of distributed shared main memory system distributed in a plurality of processing units. The present invention may also be applicable to other main memory structure. For example, the present invention may be applied to the structure in which the main memory is centralized in one location, apart from the processing units. Furthermore, the present invention is applicable to the structure in which the main memory is comprised of multiple banks, each of these banks being distributed but not associated to a plurality of PU's.

It will be apparent for those skilled in the Art that, according to the present invention, a directory for data may be stored in the storage location thereof in the distributed shared main memory in a parallel computer, thereby enabling efficient usage of the main memory.

What is claimed is:

1. A method for controlling main memory accesses in a computer system which includes a plurality of processing units and a main memory shared by said plurality of processing units, wherein each processing unit includes a processor and a cache memory which holds a part of data held in said main memory, the method comprising the steps of:

(a) transferring a data line requested by a read request provided by one of said processing units to a cache memory therewithin from a storage location for said data line within said main memory, when there is no processing unit which has already cached said data line;

(b) storing directory information into said storage location in said main memory in place of said data line, in response to said transferring step (a), said directory information indicating that said one processing unit is a processing unit which has cached said data line;

(c) transferring said data line from said cache memory within said one processing unit as designated by said directory information to another of said plurality of processing units, in response to a new read request provided by said another processing unit for said data line after said data line has been cached by said one processing unit;

(d) renewing the directory information stored in said storage location so that said renewed directory information indicates that said another processing unit is also a processing unit which has cached said data line; and (e) responsive to replacement of said data line by one of said plurality of processing units which has cached said data line, controlling writing back of said replaced data line, depending upon said directory information, so that said replaced data line is written back into said storage location of said main memory in place of said directory information stored therein, when there is no processing unit in which said data line is still cached, and so that said replaced data line is not written back, when said data line is still cached in one of said plurality of processing units.

2. The method of controlling main memory accesses according to claim 1, wherein said step (e) of controlling the writing back of said replaced data line comprises the steps of:

detecting whether there is at least one processing unit in which said data line is still cached, depending upon said directory information;

writing back said replaced data line into said storage location of said main memory when said detecting indicates that there is no processing unit in which said data line is still cached; and not writing back said replaced data line when there is at least one processing unit in which said data line is still cached, irrespective of whether or not said replaced data line has been modified after said data line has been transferred to said cache memory of said one processing unit which has replaced said data line.

3. The method for controlling main memory accesses according to claim 1, further comprising the steps of:

storing status information in correspondence to said storage location before execution of said step (a), said status information indicating whether or not a data line at said storage location is already cached in one of said plurality of processing units;

activating said transferring step (a) when said status information indicates that a data line at said storage location is not cached in any of said plurality of processing units;

activating said transferring step (c) when said status information indicates that a data line at said storage location is already cached in at least one of said plurality of processing units; and altering said status information after execution of said step (e), to indicate that said data line at said storage location is not cached by any of said plurality of processing units.

4. The method for controlling main memory accesses according to claim 1, further comprising the steps of:

storing status information in correspondence to said storage location before execution of said step (a), said status information indicating whether or not a data line at said storage location is read only data;

activating said step (b) when said status information has indicated that a data line at said storage location is not read only data, and prohibitting execution of said step (b) when said status information indicates that a data line at said storage location is read only data;

activating said step (c) when said status information indicates that a data line at said storage location is not read only data; and transferring said data line at said storage location of said main memory to said cache memory of said another processing unit which has issued said another data read request when said status information indicates that a data line at said storage location is read only data.

5. The method for controlling main memory accesses according to claim 1, further comprising the steps of:

(f) generating a cache invalidation request for said data line at said storage location by one of said plurality of processing units which has cached said data line when said one processing unit has renewed said cached data line;

(g) detecting each of every at least one of a plurality of processing units in which said data line is cached based upon said directory information stored in said storage location of said main memory; and (h) transferring said cache invalidation request to said each processing unit in which said data line is cached as has been detected in the step (g).

6. A method for controlling main memory accesses in a parallel computer system which includes a plurality of processing units and a network which connects said plurality of processing units for parallel transfer of plural data therebetween, wherein each of said processing units includes a processor, one of a plurality of partial main memories which realize a main memory shared by said plurality of processing units, and a cache memory which holds a part of data held in said main memory, the method comprising the steps of:

(a) transferring a data line held in a storage location within one of said plurality of partial main memories, provided within one of said plurality of processing units, to a cache memory within another of said processing units, in response to a data read request for said data line transferred to said one processing unit by way of said network from said another processing unit when there is no processing unit in which said data line is cached;

(b) storing directory information into said storage location of said one partial main memory in place of the data line in response to the transferring step (a), said directory information indicating that said another processing unit has cached said data line;

(c) said one processing unit responding to a new read request for said data line transferred to said one processing unit from yet another of said plurality of processing units by way of said network after said data line has been cached by said another processing unit, detecting said another processing unit as a processing unit which has cached said data line based upon said directory information, and requesting said another processing unit, by way of said network, to transfer said data line to a cache memory of said yet another of said plurality of processing units;

(d) said another processing unit responding to said requesting and transferring said data line from said cache memory within said another processing unit to said yet another processing unit by way of said network; and (e) renewing the directory information stored for said data line in said one partial main memory so that said renewed directory information indicates that said further another processing unit also has cached said data line.

7. The method for controlling main memory accesses according to claim 6, further comprising the steps of:

(f) transferring said data line from one of said plurality of processing units which has cached said data line to said one processing unit by way of said network when said one processing unit has replaced said data line from a cache memory therewithin;

(g) said one processing unit judging whether said transferred data line is cached in one of said plurality of said processing units, based upon said directory information stored in said storage location of said one partial main memory for said transferred data line;

(h) writing back said transferred data line into said storage location of said one partial main memory when said judging indicates that there is no processing unit which has cached said data line; and (i) not writing back said transferred data line into said storage location of said one partial main memory when said judging indicates that there is at least one processing unit which has cached said data line.

8. The method for controlling main memory accesses according to claim 7, wherein said one processing unit which has replaced said data line executes said transferring step (f), irrespective of whether said data line has been modified after said data line has been cached in said one processing unit which has replaced said data line.

9. The method for controlling main memory accesses according to claim 6, further comprising the steps of:

storing status information in correspondence to said storage location before execution of said step (a), said status information indicating whether or not said data line at said storage location is already cached in one of said plurality of processing units;

activating said transferring step (a) when said status information has indicated that said data line at said storage location is not cached in any of said plurality of processing units; and activating said transferring step (c) when said status information has indicated that said data line at said storage location is already cached in one of said plurality of processing units.

10. The method for controlling main memory accesses according to claim 6, further comprising the steps of:

storing status information in correspondence to said storage location before execution of said step (a), said status information indicating whether or not said data line at said storage location is read only data;

activating said step (b) when said status information has indicated that said data line at said storage location is not read only data, and prohibiting execution of said step (b) when said status information indicates that said data line at said storage location is read only data;

activating said step (c) when said status information indicates that said data line at said storage location is not read only data; and transferring said data line at said storage location of said main memory to said cache memory of said another processing unit which has issued said another data read request when said status information indicates that said data line at said storage location is read only data.

11. A method for controlling main memory accesses in a computer system which includes a plurality of processing units and a main memory shared by said plurality of processing units, wherein each processing unit includes a processor and a cache memory which holds a part of data held in said main memory, the method comprising the steps of:

(a) transferring a data line requested by a read request provided by one of said processing units to a cache memory therewithin from a storage location for said data line within said main memory when there is no processing unit which has already cached said data line other than said one processing unit;

(b) transferring said data line as requested by said read request provided by said one processing unit to a cache memory therewithin from a cache memory within another of said plurality of processing units which has cached said data line; and (c) writing back said data line cached in one of said plurality of processing units into said storage location of said main memory in response to replacement of said data line from a cache memory within said one processing unit which has cached said data line when said data line does not remain cached in any processing unit other than said one processing unit which has replaced said data line, and not writing back said replaced data line when said data line remains cached in another of said plurality of processing units.

12. The method for controlling main memory accesses according to claim 11, further comprising a step of:

transferring said replaced data line from said one processing unit which has replaced said data line to said main memory as data to be written back, irrespective of whether said data line has been modified after said data line has been cached in said one processing unit which has replaced said data line;

wherein said writing back step (c) is executed for said data line transferred to said main memory from said one processing unit which has replaced said data line.

13. The method for controlling main memory accesses according to claim 11, further comprising the steps of:

keeping status information in correspondence to said storage location of said main memory after said data line has been transferred by said step (a) to said one processing unit which has requested said data line until said data line is written back into said storage location of said main memory by said step (c) from one of said plurality of said processing units which has replaced said data line, said status information indicating that said data line at said storage location is cached in one of said plurality of processing units;

keeping directory information in correspondence to said storage location of said main memory after said data line has been transferred in said step (a) to said one processing unit which has requested said data line until said data line is written back into said storage location of said main memory in said step (c) from one of said plurality of said processing units which has replaced said data line, said directory information indicating each processing unit which has cached said data line;

activating said transferring step (a) when said status information is not yet kept for said storage location;

detecting said another processing unit which has cached said data line, based upon said directory information stored for said storage location when said status information is already kept for said storage location;

activating said transferring step (b) so that said detected another processing unit is involved in said transferring step (b); and altering said directory information in response to execution of said step (b) to indicate that said one processing unit which has requested said data line is also one which has cached said data line of said storage location.

14. A method for controlling main memory accesses according to claim 13, wherein said directory information for said storage location is stored in said storage location in place of said data line after execution of said transferring step (a).

15. The method for controlling main memory accesses according to claim 11, further comprising the steps of:

storing status information in correspondence to said storage location before execution of each of said steps (a) and (b), said status information indicating whether or not said data line at said storage location is read only data;

activating said steps (a) and (b) when said status information has indicated that said data line at said storage location is not read only data;

activating said transferring step (a), irrespective of whether or not said data line is cached in one processing unit other than said one processing unit which has provided said read request when said status information indicates that said data line at said storage location is read only data;

storing status information in said one processing unit which has requested said data line in correspondence to said data line transferred to said one processing unit as a result of said activating of step (a), said stored status information indicating said transferred data line is read only data;

activating said step (c) when status information for said replaced data line stored in said one processing unit which has replaced said data line indicates that said data line is not read only data; and prohibiting writing back of said replaced data line when said status information for said data line indicates said data line is read only data.

16. The method for controlling main memory accesses according to claim 11, further comprising the steps of:

(d) generating a cache invalidation request for said data line by one of said plurality of processing units which has cached said data line when said one processing unit has renewed said cached data line; and (e) transferring said cache invalidation request to each processing unit which has cached said data line, other than said one processing unit which has generated said cache invalidation request.

17. A method for controlling main memory accesses in a parallel computer system which includes a plurality of processing units and a network which connects said plurality of processing units for parallel transfer of plural data therebetween, wherein each processing unit includes a processor, one of a plurality of partial main memories which realize a main memory shared by said plurality of processing units, and a cache memory which holds a part of data held in said main memory, the method comprising the steps of:

(a) judging, by one of said plurality of processing units, whether a data line held in a storage location within one of said plurality of partial main memories, provided within said one processing unit is already cached in another of said plurality of processing units, in response to a data read request for said data line transferred to said one processing unit from another processing unit by way of said network;

(b) said one processing unit transferring said data line from said storage location of said one partial main memory to said another processing unit which has requested said data line by way of said network when said judging step indicates that no processing unit has cached said data line;

(c) said one processing unit requesting said another of said plurality of processing units by way of said network to transfer said cached data line to said another processing unit which has generated said data read request when said judging step indicates that said another processing unit has cached said data line;

(d) said another processing unit which has cached said data line transferring said data line cached therein by way of said network to said another processing unit which has requested said data line, in response to said requesting;

(e) transferring said data line from one of said plurality of processing units which has cached said data line to said one processing unit by way of said network when said one processing unit has replaced said data line after caching thereof;

(f) said one processing unit judging whether a same data line as said transferred data line remains cached in one of said plurality of processing units other than said one processing unit which has replaced said data line;

(g) writing back said transferred data line into said storage location of said one partial main memory when said judging indicates that there is no processing unit which has cached said data line; and (h) not writing back said transferred data line into said storage location of said one particular partial main memory when said judging indicates that there is a processing unit which has cached said data line.

18. The method for controlling main memory accesses according to claim 17, wherein said one processing unit which has replaced said data line executes said transferring step (e), irrespective of whether said data line has been modified after said data line has been cached in said one processing unit which has replaced said data line.

19. The method for controlling main memory accesses according to claim 17, further comprising the steps of:

keeping directory information in correspondence to said storage location after said data line has been transferred in said step (b) to said another processing unit which has requested said data line until said data line is written back into said storage location by said step (g), a status information indicating which of said plurality of processing units has cached said data line; and renewing said directory information after execution of each of said steps (c) and (f);

wherein said judging step (a) includes a step of judging whether directory information is already stored in correspondence to said storage location and judging whether there is another processing unit which has cached said data line of said storage location other than said one processing unit, based upon said directory information stored in correspondence to said storage location when said directory information is already stored in correspondence to said storage information, wherein said judging step (f) is executed based upon directory information stored in correspondence to said storage location for said transferred data line.

20. The method for controlling main memory accesses according to claim 19, wherein said directory information is stored in said storage location for said data line in place of said data line after execution of said step (a);

wherein said replaced data line is written back into said storage location at step (g) in place of said directory information held therein.

21. The method for controlling main memory accesses according to claim 17, further comprising the steps of:

storing status information in correspondence to said storage location before execution of said step (a), said status information indicating whether or not said data line at said storage location is read only data;

activating said steps (a) to (d) when said status information has indicated that said data line at said storage location is not read only data;

responsive to said data read request mentioned in step (a), transferring said data line from said storage location of said main memory to said another processing unit which has requested said data line, irrespective of whether said data line has been cached in one of said plurality of processing units.

22. A computer system, including:

a plurality of processing units;

a main memory shared by said plurality of processing units; and a main memory control circuit which controls accesses to said main memory by said plurality of processing units, wherein each processing unit includes:

a processor, and a cache memory which holds a part of data held in said main memory;

wherein said main memory control circuit includes:

a main memory access control circuit which responds to data read request and data write requests provided by said plurality of processing units and accesses said main memory; and a directory information generation circuit which responds to operations of said main memory access control circuit and generates either one of directory information for each storage location of said main memory and renewed directory information generated by said directory generation circuit for said each storage location, said directory information for said each storage location indicating each of said processing units which has cached a data line held in said each storage location;

wherein said main memory access control circuit includes:

an access circuit responsive to a data read request provided by one of said plurality of processing units, for reading a data line requested by said read request from a storage location for said data line within said main memory when there is no processing unit which has already cached said data line, and transferring said read data line to said one processing unit;

a write circuit responsive to said transferring of said data line for writing directory information generated by said directory generation circuit for said data line into said storage location for said data line in place of said data line, and a data transfer request circuit responsive to another data read request given by another of said plurality of processing units for said data line after said data line has been transferred to said one processing unit, for detecting said one processing unit as a processing unit which has cached said requested data line, based upon said directory information stored in said storage location for said data line, and requesting said one processing unit to transfer said data line which has been transferred thereto from a cache memory of said one processing unit to said another processing unit, wherein said directory information generation circuit further generates renewed directory information of said directory information generated for said storage location and stored therein by said write circuit, when said data line is requested by another data read request and has been transferred from said one processing unit to said another processing unit by said data transfer request circuit, said renewed directory information for said storage location indicating said one processing unit and said another processing unit as having cached said data line held in said storage location, wherein said write circuit further rewrites said directory information written into said storage location by said write circuit by said renewed directory information.

23. The computer system according to claim 22, wherein said main memory access control circuit further includes:

a write back control circuit responsive to replacing of said data line by one of said plurality of processing units, for detecting whether or not said data line is cached in any of said plurality of processing units and writing back said replaced data line into said storage location of said main memory in place of said directory information stored therein when there is no processing unit which has cached said data line and not writing back said replaced data line when there is one processing unit which has cached said data line.

24. A computer system, including:

a plurality of processing units; and a network for connecting said plurality of processing units for transfer of plural data therebetween;

wherein each processing unit includes:

a processor, one of a plurality of partial main memories which are distributed in said plurality of processing units and realizes a main memory shared by said plurality of processing units;

a partial main memory access control circuit which controls accesses to said one partial main memory, and a cache memory which holds a part of data held in said one partial main memory;

wherein said partial main memory control circuit includes:

a partial main memory access control circuit which responds to data read requests and data write requests provided by said plurality of processing units and accesses said main memory, and a directory information generation circuit which responds to operations of said partial main memory access control circuit and generates either one of directory information for each storage location of said partial main memory and renewed directory information of directory information generated by said directory generation circuit for said each storage location, said directory information for each storage location indicating each of every at least one of a plurality of processing units which has cached a data line held in said each storage location;

wherein said partial main memory access control circuit includes:

an access circuit responsive to a data read request provided by one of said plurality of processing units, for reading a data line requested by said read request from a storage location for said data line within said partial main memory when there is no processing unit which has already cached said data line, and transferring said read data line to said one processing unit, a write circuit responsive to said transferring of said data line for writing directory information generated by said directory generation circuit for said data line into said storage location for said data line in place of said data line, and a data transfer request circuit responsive to another data read request given by another of said plurality of processing units for said data line after said data line has been transferred to said one processing unit, for detecting said one processing unit as a processing unit which has cached said requested data line, based upon said directory information stored in said storage location for said data line, and requesting said one processing unit to transfer said data line which has been transferred thereto from a cache memory of said one processing unit to said another processing unit, wherein said directory information generation circuit further generates renewed directory information of said directory information generated for said storage location and stored therein by said write circuit, when said data line is requested by another data read request and has been transferred from said one processing unit to said another processing unit by said data transfer request circuit, said renewed directory information for said storage location indicating said one processing unit and said another processing unit as having cached said data line held in said storage location, wherein said write circuit further rewrites said directory information written into said storage location by said write circuit by said renewed directory information.

25. The computer system according to claim 24, wherein said partial main memory access control circuit further includes:

a write back control circuit responsive to replacing of said data line by one of said plurality of processing units, detecting whether or not said data line is cached in any of said plurality of processing units, and writing back said replaced data line into said storage location of said partial main memory in place of said directory information stored therein when there is no processing unit which has cached said data line and not writing back said replaced data line when there is one processing unit which has cached said data line.

* * * * *

UNITED STATES PATENT AND TRADEMARK OFFICE
CERTIFICATE OF CORRECTION

PATENT NO. : 5,606,686
DATED : February 25, 1997
INVENTOR(S) : TARUI, et al.

It is certified that error appears in the above-indentified patent and that said Letters Patent is hereby corrected as shown below:

Column 4, line 34, delete "C" and insert --cached--; same line, after "field" insert --(hereinafter "C")--.

Column 4, line 36, delete "RO" and insert --read only--; same line, after "field" insert --(hereinafter "RO")--.

Column 6, line 29, delete "state" and insert --states "Exclusive", "Shared" and "Read Only", hereinafter referred to as, respectively,--.

Column 7, line 16, after "invalid" insert --(hereinafter referred to as "I")--.

Column 10, line 1, delete "(FL)." and insert --(FL),--.

Claim 19, line 8, delete "a status" and insert --said directory--.

Signed and Sealed this

Second Day of September, 1997

Attest:

BRUCE LEHMAN

*Attesting Officer*   *Commissioner of Patents and Trademarks*